United States Patent [19]

Kuckhermann et al.

[11] Patent Number: 5,613,435
[45] Date of Patent: Mar. 25, 1997

[54] APPARATUS FOR PALLETIZING TUBE SECTIONS OF PAPER OR THE LIKE

[75] Inventors: Gustav Kuckhermann, Lengerich, Germany; Robert Corteccia, Roullet, France

[73] Assignee: SEEMI Societé d'Etudes d'Equipements de Modernisation Industrielle, La Couronne, France

[21] Appl. No.: 659,476

[22] Filed: Jun. 6, 1996

Related U.S. Application Data

[62] Division of Ser. No. 314,483, Sep. 28, 1994.

[30] Foreign Application Priority Data

Oct. 5, 1993 [DE] Germany .......................... 43 33 906.9
Dec. 9, 1993 [DE] Germany ............................ 9318897 U

[51] Int. Cl.[6] ................................................... B30B 7/02
[52] U.S. Cl. .......................... 100/196; 100/200; 100/215; 414/222; 414/331; 414/799
[58] Field of Search ...................................... 100/193, 194, 100/196, 199, 200, 215, 218; 414/222, 277, 331, 799

[56] References Cited

U.S. PATENT DOCUMENTS

| 2,768,756 | 10/1956 | Horman ................................... 100/218 |
| 3,389,652 | 6/1968 | Bruder et al. ........................... 414/277 |
| 3,450,030 | 6/1969 | Hütz ........................................... 100/35 |
| 4,478,673 | 10/1984 | Plocher ................................... 414/277 |
| 4,527,938 | 7/1985 | Leavitt, Jr. .............................. 100/196 |
| 4,993,937 | 2/1991 | Ginnasi .................................... 100/215 |
| 5,046,911 | 9/1991 | Ogura et al. ............................ 414/799 |
| 5,358,375 | 10/1994 | Kawada et al. ......................... 414/222 |

FOREIGN PATENT DOCUMENTS

| 614986 | 6/1935 | Germany ................................ 100/196 |
| 3444093 | 6/1986 | Germany . |
| 3644517 | 7/1988 | Germany ................................ 414/277 |
| 8812067 U | 12/1988 | Germany . |
| 9211262 U | 12/1992 | Germany . |
| 47-590 | 1/1972 | Japan ..................................... 100/196 |
| 659405 | 4/1979 | U.S.S.R. .................................. 100/215 |

*Primary Examiner*—Stephen F. Gerrity
*Attorney, Agent, or Firm*—Jordan and Hamburg

[57] ABSTRACT

In a method for palletizing tube sections of paper or similar materials closed by means of a longitudinally glued seam into a tube form for producing sacks or bags, the tube sections are supplied in the form of tube packages from a tube machine with loading equipment to a palletizing apparatus. The tube packages are turned over individually or in groups with this loading equipment to a respective supporting base of a multideck pallet and held, compressed flat on their respective supporting base in a storage position of the pallet between the process of palletizing and a later depalletizing. To implement a palletizing process, the respective tube package is lifted into the loader and then moved into the pallet into a position, in which it is a distance above the supporting base. When it reaches the intended position, it carries out a vertical deposition motion and is deposited on the supporting base. Immediately after the supporting base is covered with one or several tube packages, the latter are compressed flat individually for this supporting base.

40 Claims, 25 Drawing Sheets

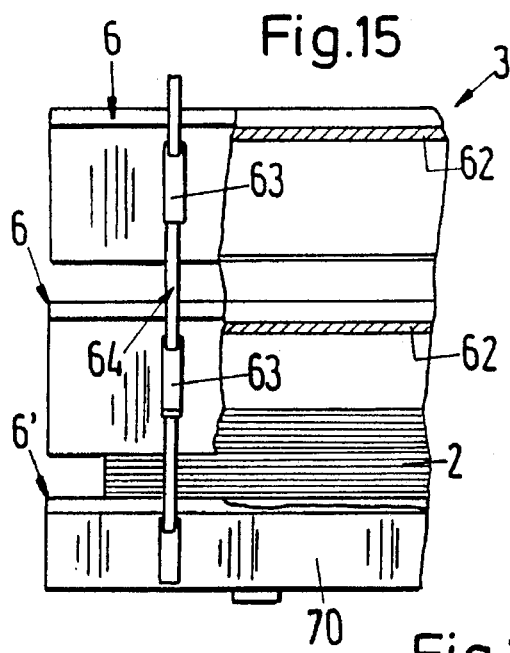
Fig.15
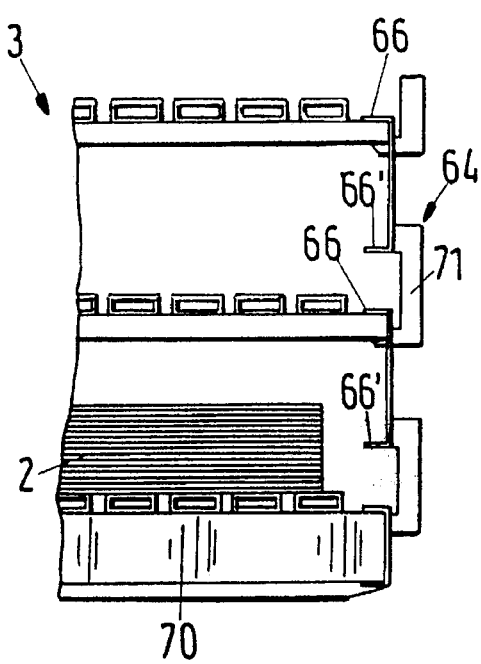
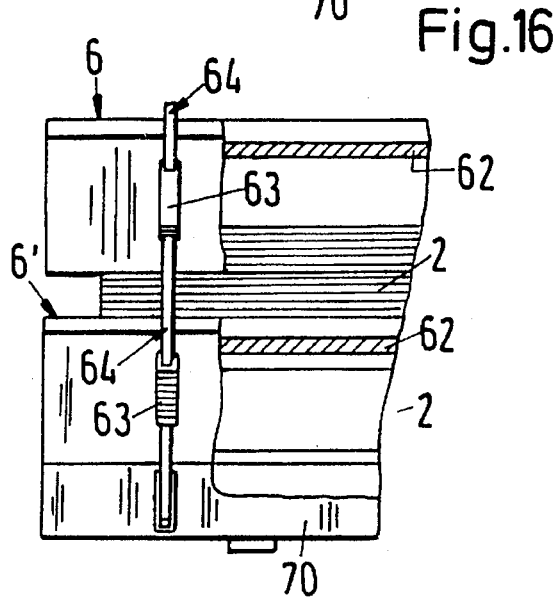
Fig.16
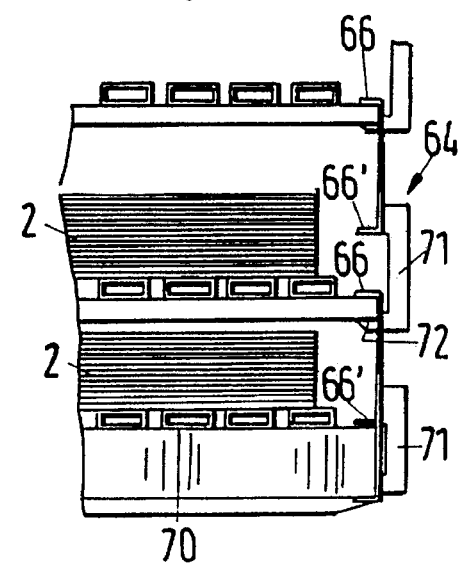
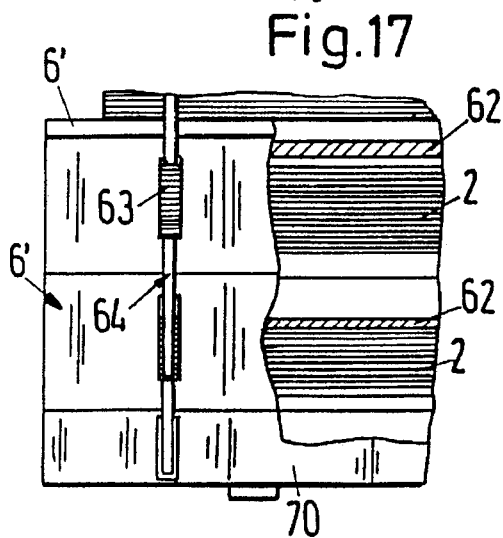
Fig.17
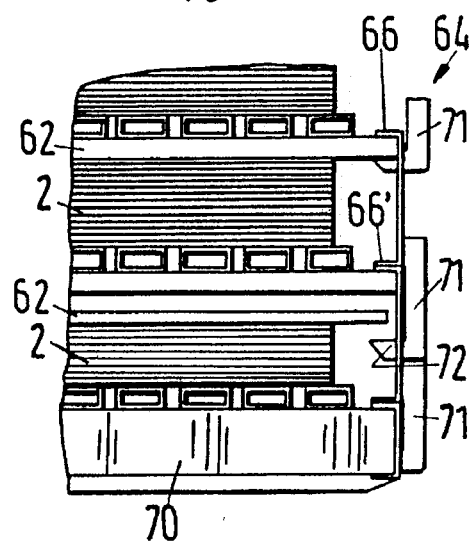

ns of paper.
APPARATUS FOR PALLETIZING TUBE SECTIONS OF PAPER OR THE LIKE

This is a division of application Ser. No. 08/314,483, filed Sep. 28, 1994 (pending).

BACKGROUND OF THE INVENTION

The invention relates to a method and an apparatus for palletizing and depalletizing tube sections of paper.

For known methods and apparatuses (DE 34 44 093 C2) for palletizing and depalletizing tube sections of paper or similar materials closed by means of a longitudinally glued seam into a tube form for producing sacks or bags, the tube sections are supplied in the form of tube packages from the tube machine by means of the loader to the palletizing equipment. After that, the tube packages are positioned on the respective supporting bases of the multideck pallet over a conveyor belt and, after the supporting bases are covered, the multideck pallet is taken out of the palletizing apparatus, the individual layers of the tube packages being compressed flat by their own weight with a pressure that increases towards the bottom. Since the longitudinal and/or transverse gluings of the tube sections are still fresh, these can be pressed together so strongly, particularly in the lower region, that the adhesive penetrates through the paper and the individual tube sections are glued together during their stay in the storage position. With that, the further processing of the tube package is associated with disadvantageous malfunctions of the course of the production.

In a further solution pursuant to G 88 12 067.8, the palleting equipment, which is provided with fixed decks in practice, is loaded by means of a telescope-conveyor belt. Because of acceleration and deceleration of each package, the tube sections can shift relative to one another and the tube package can no longer be deposited with straight edges. The compression plates, assigned to the respective supporting base, can be positioned only over a jointly operated compression plate lowering device into the pressing position on the respective tube package, so that pressing is possible only after all the supporting bases of the multideck pallet have been filled completely.

For a solution pursuant to G 92 11 262.5, the supporting bases can also be lowered only when the whole pallet is filled. Furthermore, the scissors mechanism, which is provided on this equipment, requires a largely uniform thickness of the respective tube package on the supporting bases, so that the equipment cannot be used very flexibly in automatic production lines.

SUMMARY OF THE INVENTION

The invention is concerned with the problem of providing a method and an apparatus of the initially given type, with which, with little technical effort, a positionally stable and rapid handling of the tube packages is possible and a largely delay-free pressing of the tube package can also be achieved.

With the inventive method, the tube package in question is so positioned by a lifting motion during the palletizing process that the stacked tube sections of the tube package are positionally stable and can be brought largely without displacements within the stack into the region of the respective supporting base in the pallet and deposited by a simple lowering motion, so that it is ensured that all tube sections of a tube package are deposited precisely above one another with straight edges, particularly during the whole of the palletizing process. After the tube packages are deposited on the supporting base, the flat compression of the tube packages for further handling appropriate for storing can be achieved after a single lowering and without delays advantageously by way of a single pressing in the region of this supporting base. With this, the method makes it possible, by means of charging the decks controllably, to adapt to the different patterns of filling the tube packages on the respective supporting base flexibly with little effort and to fill the multideck pallet without additional effort also with stacks of different height resulting from customer-specific different amounts of tube sections, so that a largely complete utilization of the stacking surface and stacking height is achieved.

Furthermore, a pliers-like clamping is imposed on the tube package during the handling simultaneously with the lifting motion, so that the tube packages, during the whole of the palletizing process, commencing with introduction into the palletizing equipment and up to the end of the lowering motion, can be moved at a greater speed and, by means of an increase in the loading performance, the productivity and flexibility of the method of palletizing and depalletizing can thus be increased as a whole.

With the inventive equipment for palletizing tube sections, the tube package, positioned by means of delivery equipment on a receiving part of the loader is so positioned in the region of the guiding carriage with the lifting fork, which is moveable perpendicularly to the receiving level, that no transverse forces, which would change its stack position, are acting on the tube package or the tube sections during the subsequent movement, by which the tube package is introduced into the pallet. In an advantageous construction, a temporary clamping is imposed on the tube package during the loading (or unloading) process by components acting together like pliers, that the movement of the lifting fork, by which the tube package is introduced into the pallet, can be carried out at a high speed between the respective supporting bases of the multideck pallet. In an advantageous development of the multideck pallet, the tube packages in the storage position can thereafter be exposed, by way of an individual lowering of the compression plate in the direction of the respective covered supporting base taking place with slight delay, to a sufficient pressing, that properly stacked tube sections can be taken from the tube packages for further processing during the later depalletizing.

In an advantageous development, the apparatus can be provided in the region of the multideck pallet with respective supporting bases, which are connected over height-adjustable carrying and supporting brackets in such a manner, that the compression plate, after a single lowering of the supporting bases, lies on the tube packages. At the same time, the carrying and supporting brackets form extremely simple components, so that the multideck pallet can be combined with little technical effort into a customer-specific size with any number of supporting bases and adaptable to different production plans. The individual lowering makes possible a high storage capacity and an optimal utilization of the available floor height.

For a second, advantageous embodiment of the inventive apparatus, the latter can be provided in the region of the multideck pallet with a holding device for the compression plates, which is independent of the supporting bases. With little effort, the compression plates present at stationary supporting bases can be brought into the receiving or pressing position owing to the fact that a lever mechanism raises or lowers the compression plate synchronously with the movement of the loader. These compression plates, which can be lowered individually, are preferably employable when a frequent, customer-specific change in the shape of the tube and a frequent change in the number of tube sections stacked one above the other requires a flexible adaptation to production.

In a third, advantageous embodiment of the multideck pallet, the individual raising and lowering of the compression plate can also be achieved owing to the fact that the palletizing equipment is combined with lifting equipment as an individual controllable component. This lifting equipment in each case raises the compression plates of the supporting base, which is to be filled, over hinged fingers and, after the return motion of the loader out of the pallet with the lifting equipment, the compression plate is lowered into the pressing position, so that the above-described advantages of an individual lowering of the compression plate can also be achieved with this palletizing equipment.

A fourth advantageous embodiment of the inventive equipment for palletizing and depalletizing tube sections, with the mutually unconnected supporting bases as individual components for forming a multideck pallet in the form of a vertical tower, has an exceedingly simple and flexibly handleable construction, which makes possible the adaption to different storage tasks particularly in an automatic production run.

The unconnected supporting bases can be transported in a space-saving stacked position as interpenetrating components and made available with little effort for use within the palletizing equipment. Tube packages of different heights can also be positioned on the respective supporting bases and, while the immediately next, top supporting base, which is still to be covered, is lowered, a gentle pressing of the tube package, determined by the weight of the individual compression plates, is achieved.

In the storage position of the multideck pallet, the unconnected supporting bases form a perpendicular tower of a convenient height, so that, with high storage capacity, optimum utilization of the available floor height is possible also at different production sites owing to the fact that the arbitrarily variable number of supporting bases in the uncovered stacked position can be selected without additional aids and the supporting bases can be transferred to the palletizing equipment for coverage with tube packages.

The details of the invention are explained more precisely in the specification below in conjunction with the drawings, which illustrate several embodiments of an apparatus for palletizing tube sections of inventive construction.

BRIEF DESCRIPTION OF THE DRAWINGS

FIGS. 15 to 17 show sectional representations of the supporting bases in different states of coverage during the deposition of the tube package and the phases of a single lowering of the respective supporting bases.

DESCRIPTION OF THE PREFERRED EMBODIMENTS

Figure 1:
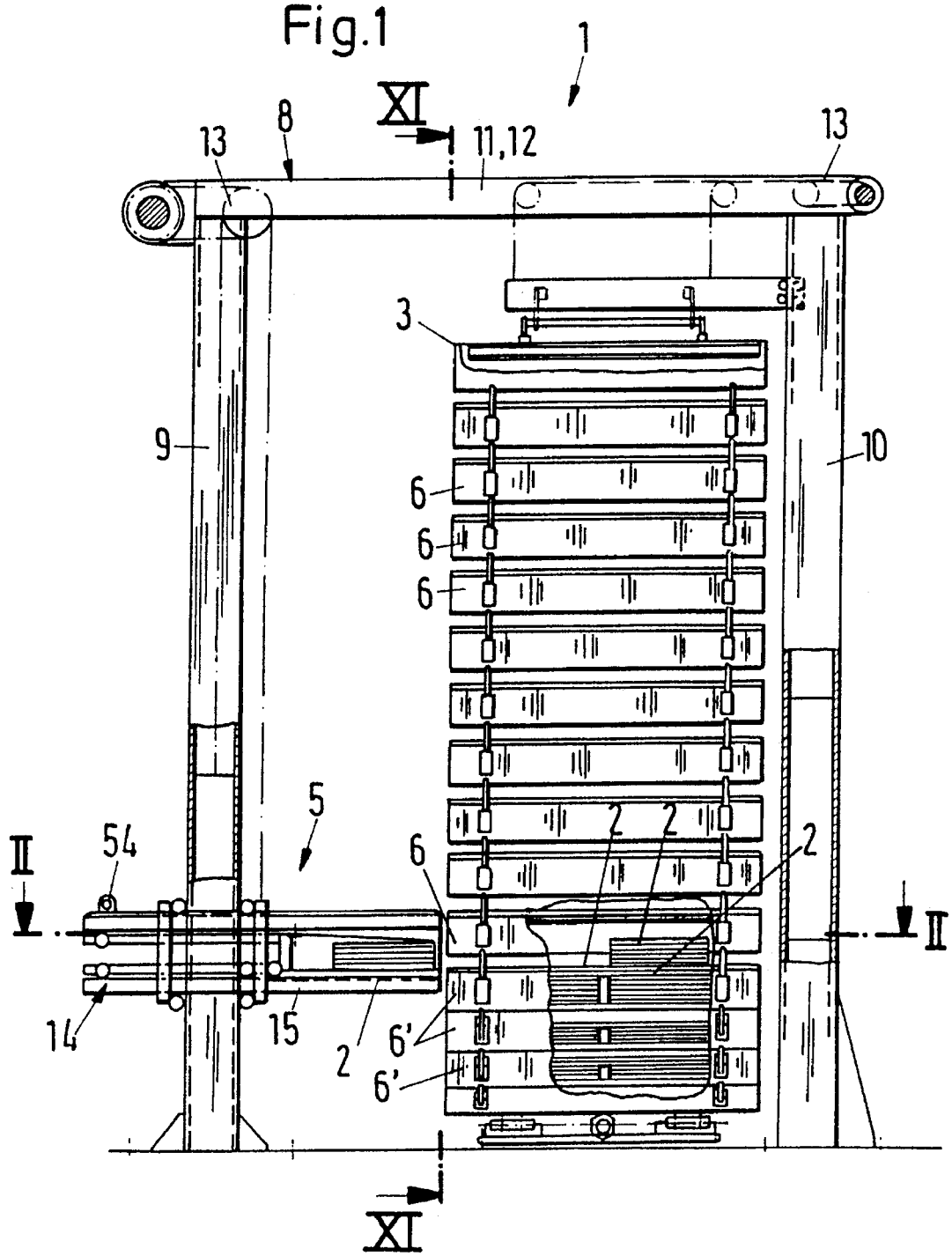
FIG. 1 shows a side view of an apparatus for palletizing and depalletizing tube packages with a multideck pallet located in the area of a loader.

In FIG. 1, a palletizing apparatus is shown, which is labeled 1 as a whole and by means of which the respective tube sections in the form of tube packages 2 can be brought into a multideck pallet 3. The tube packages 2 can be conveyed by a tube machine (not shown) over a feeder 4 (FIG. 2) into the region of loader 5, by means of which the tube packages 2 can be brought between supporting bases 6 of the pallet 3, which are in a separated receiving position. Subsequently, the loaded supporting bases 6' can be moved towards one another into the storage position.

The palletizing apparatus 1 is provided with a frame 8, on the vertical supports 9, 10 of which on the one hand the loader 5 and, on the other, the pallet 3 are supported in such a manner that their height can be adjusted. In the region of the upper transverse spars 11, 12, driving mechanisms 13 are provided for initiating the motion.

For accommodating the tube package 2, the loader 5 has a guiding carriage 14, which can be moved vertically at the transverse spar 11 at the loader 8 and with which the tube package 2 can be brought onto a comb-like receiving part 15 (FIGS. 2 and 3) horizontally opposite to the respective supporting bases 6, 6' (FIG. 1).

Figure 2:
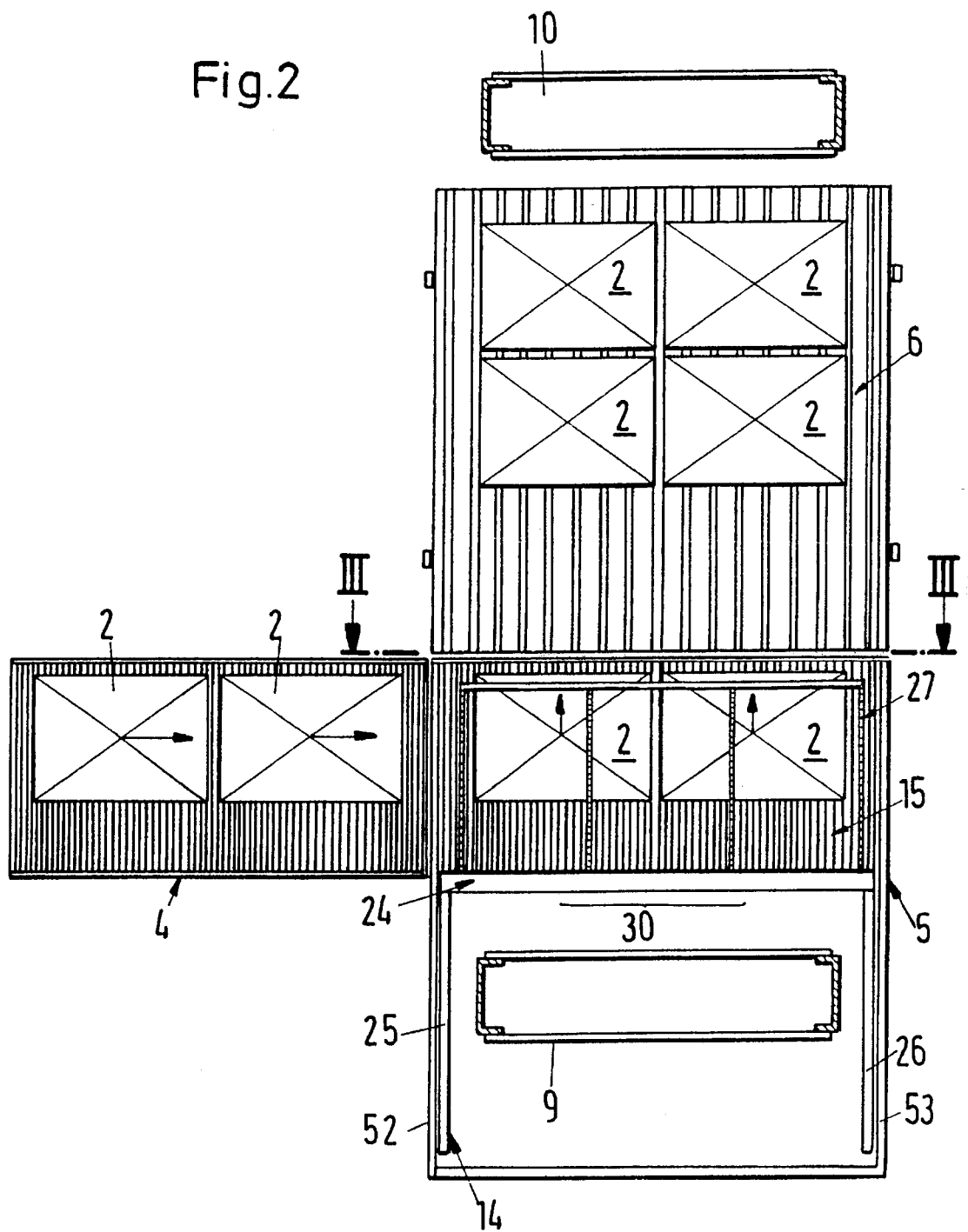
FIG. 2 shows a plan view of the apparatus for palletizing and depalletizing along a line II—II of FIG. 1.
Figure 3:
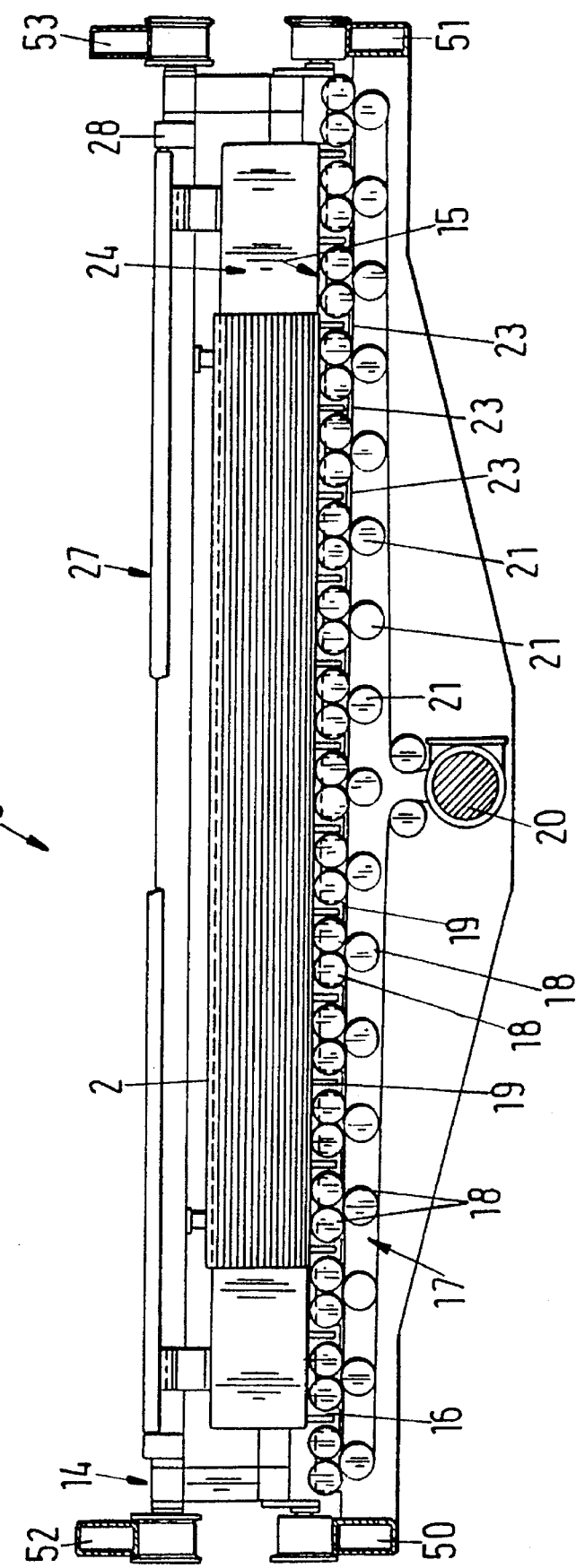
FIG. 3 shows an enlarged sectional representation of the loader with the tube package supplied, along a line III—III of FIG. 2.

In FIG. 3, an enlarged side view in the region of the loader 5 illustrates the feeding position of the tube package 2 after the latter leaves the feeder 4 (FIG. 2), the receiving part 15 for the tube package 2 being formed from several transporting rollers 17, moving in a transporting plane 16 of the tube package 2. The supporting rollers 18, which are disposed in each case in pairs, leave a gap 19. Driving rollers 21, which act together with a belt drive 20, are provided for driving the pair of supporting rollers 18.

Figure 4:
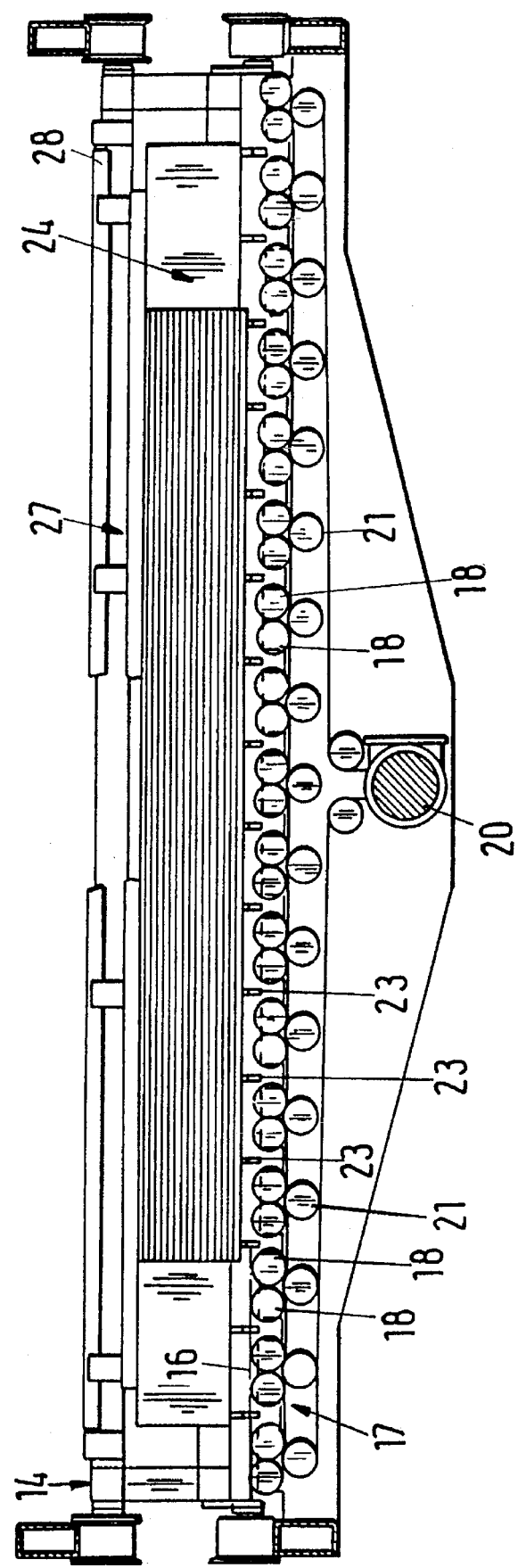
FIG. 4 shows a view of the loader similar to that of FIG. 3, with the tube package in a raised position.

A view of FIGS. 3 and 4 illustrates that the tube package 2 in the loader 5 can be raised from the starting position on the supporting rollers 18 into the transporting position (FIG. 4) at a distance vertically from these. For this purpose, the guiding carriage 14 (FIG. 5) is provided with a plurality of lifting forks 24 having lifting prongs 23. The tube package 2 can be lifted with the lifting forks 24 into the above-described transporting position (FIGS. 6 and 4). In this transporting position, the lifting fork 24 can be moved back and forth in relation to the pallet 3 and is braced at the guiding carriage 14 over respective side stanchions 25, 26 (FIG. 2).

The raised position of the lifting fork 24 of FIGS. 4 and 6 illustrates the advantageous arrangement of a holding elememt 27 in the region, in which the tube package 2 is supported. In the region of an axis of rotation 28, the holding element is pivotably connected with the guiding carriage 14 in such a manner, that at least one front supporting part 29 can be placed on the upper side of the tube package 2. In an appropriately embodied form, the holding element 27 forms a pliers part 30 (FIG. 2), which is hinged at the guiding carriage 14 and protrudes from this in the direction of the pallet 3 and which, over a common driving mechanism 31, can carry out with the lifting fork 24 a pliers-gripping motion with production of a clamping pressure in such a way, that the tube package 2 is held steadily during the transfer motion into the pallet 3 (FIG. 6).

In an appropriate embodiment, the driving mechanisms 31 for the lifting fork 24 is provided with a hydraulic or pneumatic cylinder 33, the piston 34 of which is hinged at one end to a clamping bar 36, which is mounted pivotably centrally over a supporting dock 35, and, at the other end, is in operative connection over a transfer element 37 with a rear transverse beam 38 of the lifting fork 24.

Figure 5:
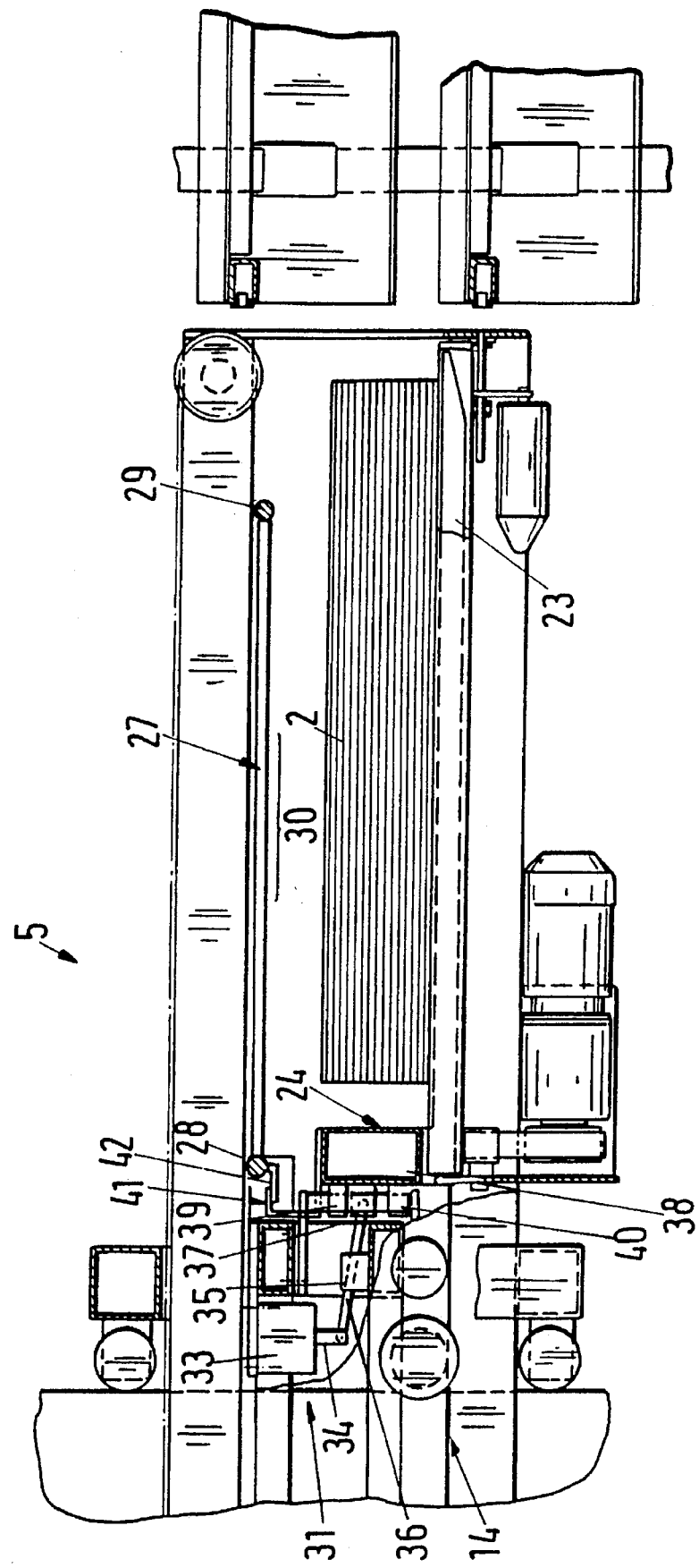
FIG. 5 shows an enlarged sectional representation of the loader of FIG. 1 with a driving mechanism for the lifting fork, provided in the region of a guiding carriage.
Figure 6:
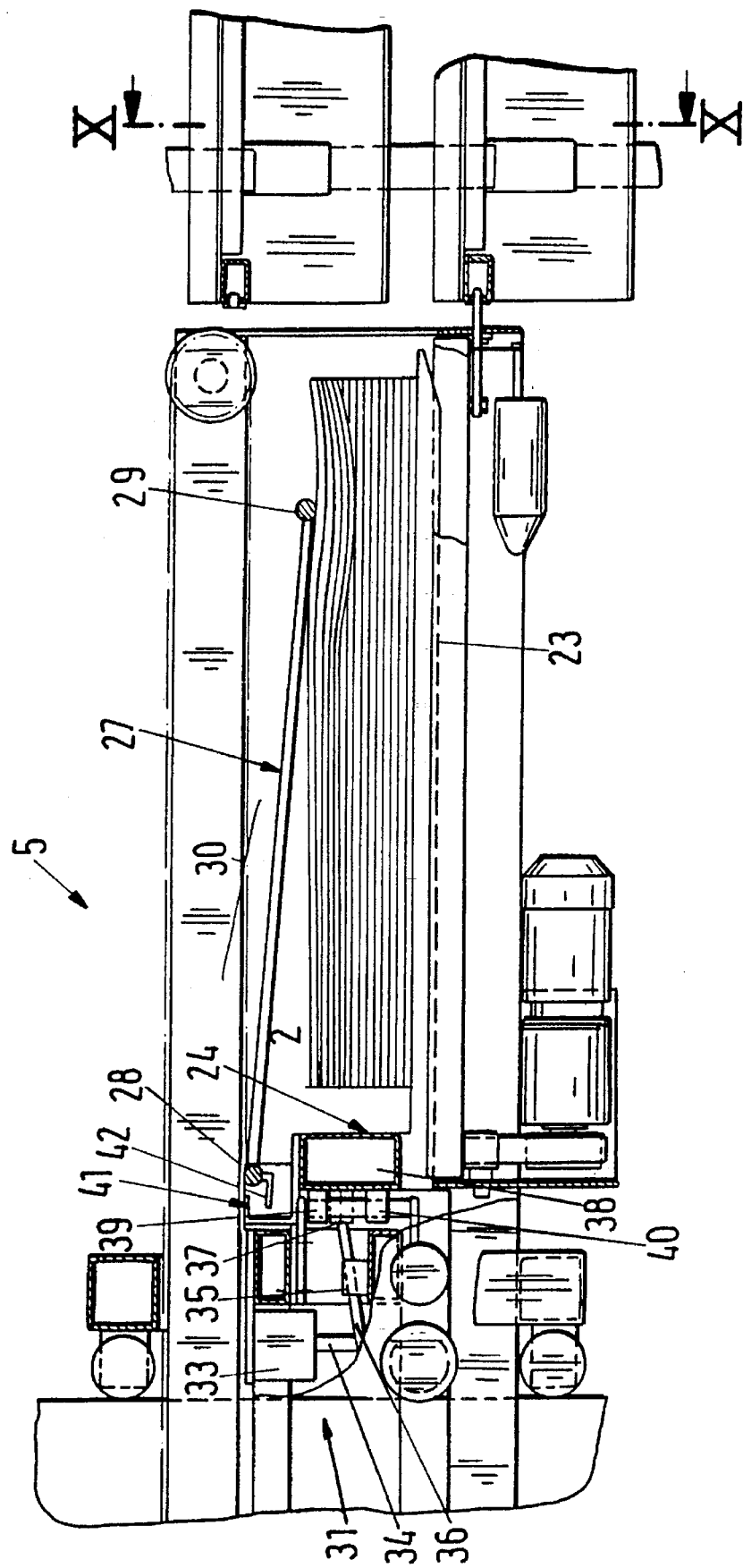
FIG. 6 shows a view similar to that of FIG. 5, with the lifting fork in the raised position of FIG. 4.

The transfer element 37 can be moved against stop parts 39, 40 on the transverse beam 38, so that, depending on the respective direction of motion of the piston rod 34, the lifting fork 24 can be raised into the transporting motion (FIG. 6) or lowered into the starting position (FIG. 5).

For the purpose of synchronizing the above-described lifting motion of the lifting fork 24 with the plier-like clamping by means of the pliers part 30, the lifting fork 24 is provided in the region of the cross beam 38 with an abutment 41, which can be moved together with the lifting fork 24 and depending on the motion of the lifting cylinder, releases a stop 42 at the end of the pliers part 30 (FIG. 6) or imparts a swiveling motion on this stop part 42, which raises the pliers part 30 (FIG. 5). With this, a pliers-like clamping by means of the pliers part 30 can be superimposed on the lifting motion of the lifting fork 24 with little technical effort, the pliers part 30 being dimensioned so that, after being released, it exerts a sufficient clamping action on the tube package 2 under the action of its own weight.

Figure 7:
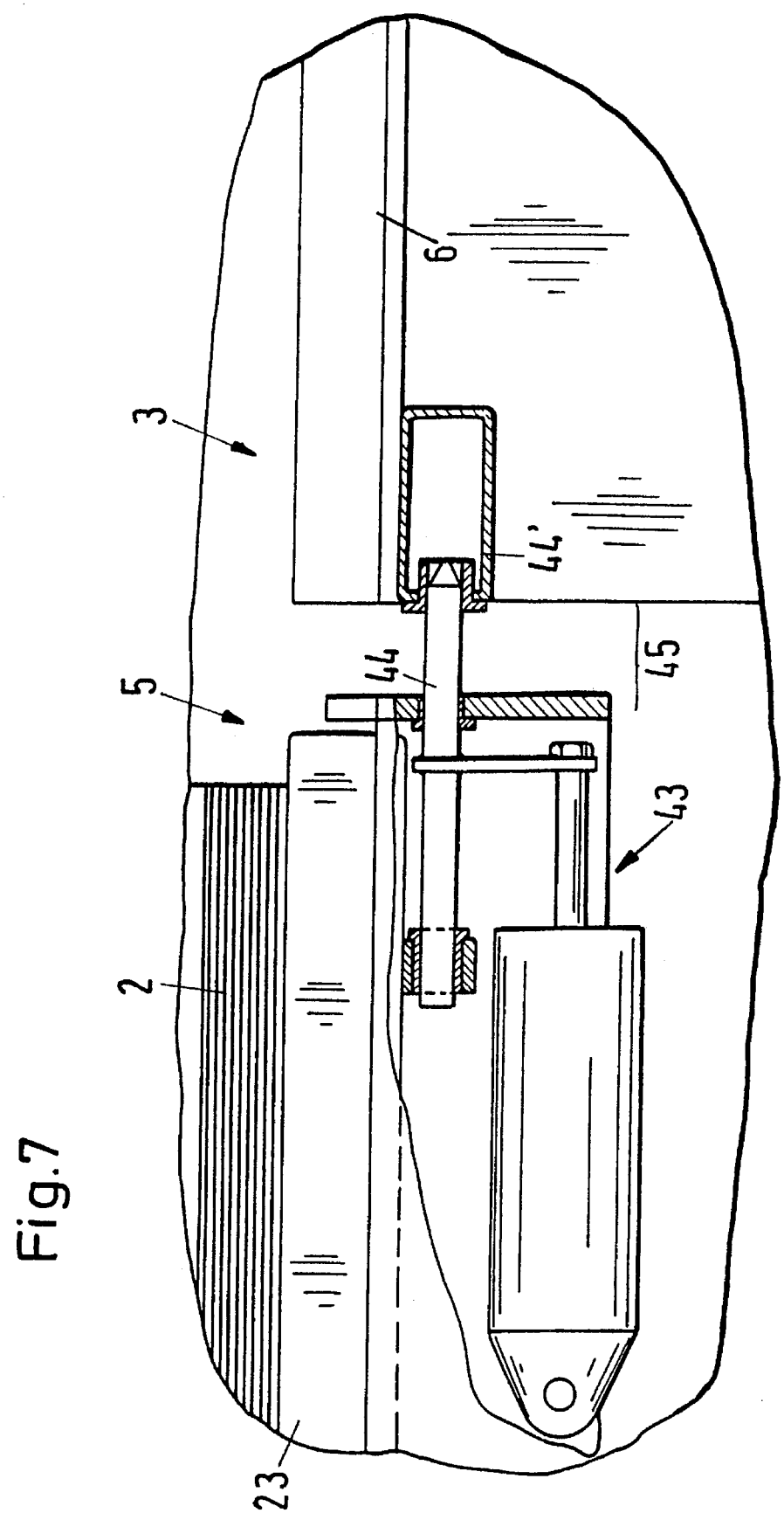
FIG. 7 shows an enlarged sectional representation of an index bolt provided in the transition gap between the loader and the multideck pallet.

The enlarged detailed representation of FIG. 7 illustrates that, in an advantageous development, the loader 5 is provided with index bolt 44, which fixes the horizontal opposition of the components, functions in the manner of a position sensor for determining the height and can be used as a supporting part. With this index bolt 44, the positioning gap 45, which is required between the loader 5 and the pallet 3 for moving along the supporting bases 6, can be bridged with little effort so that the guiding carriage 14 can be moved accurately in the horizontal direction into the pallet 3, after the index bolt 44 has been pushed by a lifting cylinder 43 into a receiving part 44' on the pallet 3.

Figure 8:
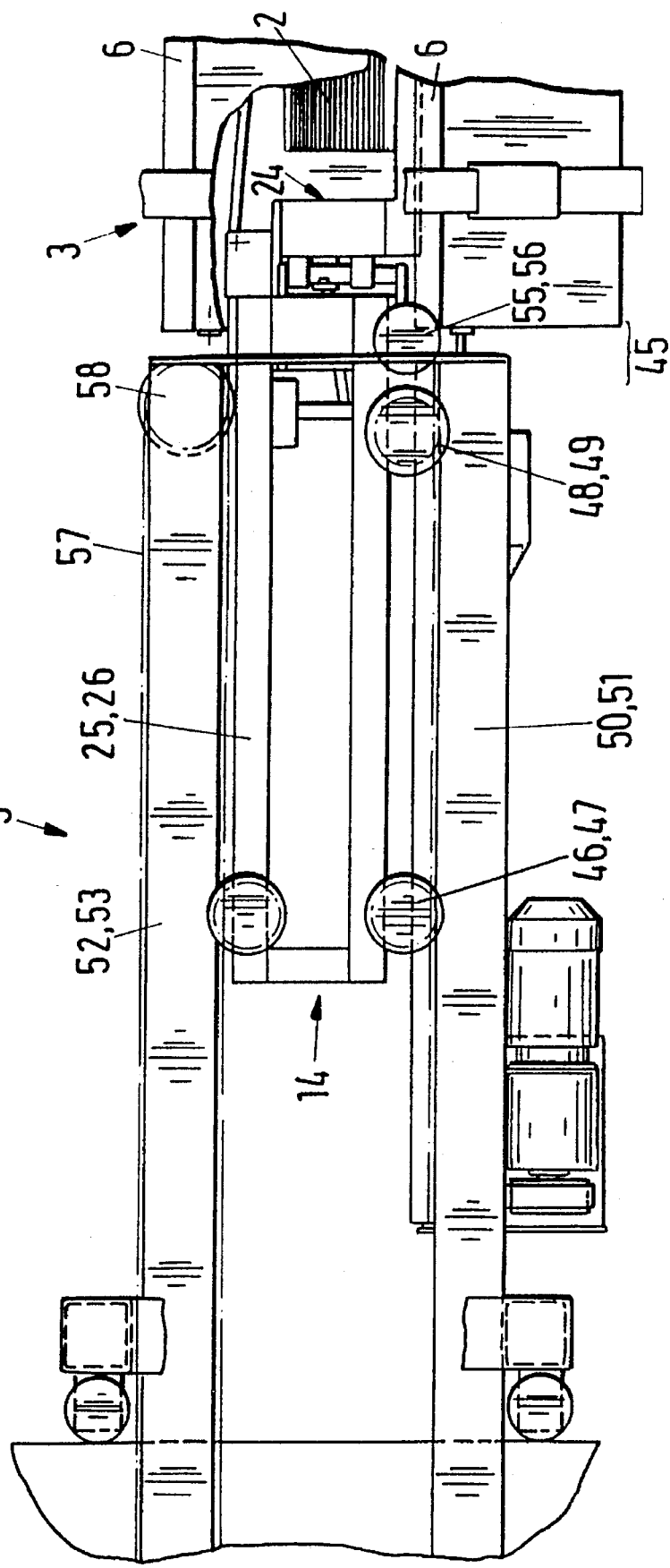
FIG. 8 shows a sectional representation with the loader moved into the region of the common transition gap to the multideck pallet.
Figure 9:
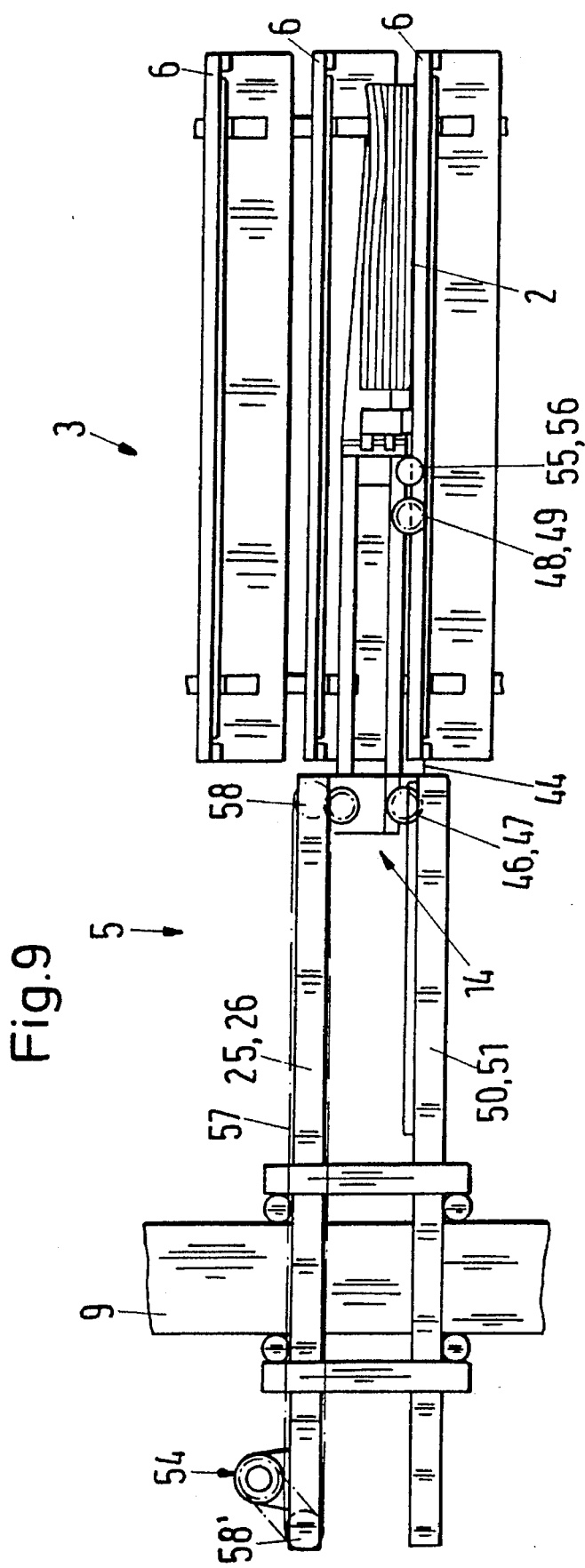
FIG. 9 shows a side view of the loader with the guiding carriage moved into depositing position in the multideck pallet.

In FIG. 8, the phase is illustrated in which the introduction of the guiding carriage 14 or the lifting fork 24 into the pallet 3 takes place and the positioning gap 45 is crossed. In an appropriate embodiment, a chassis for the guiding carriage 14 is formed for this purpose with the side stanchions 25, 26 of the lifting fork 24 (FIG. 2). This guiding carriage 14 is supported over lateral pairs of rollers 46, 47 and 48, 49 in such a manner on the sliding rails 50, 51 as well as on the respective upper counter-stanchions 42, 53 (FIG. 3), that the lifting fork 24 can be moved as far as a rear depositing position on the pallet 3 (FIG. 9), the tube package 2, which is in the raised transporting position, not coming into contact with parts of the pallet 3 in any of the motion phases.

For crossing the position gap 45 (FIG. 8), an additional pair of rollers 55, 56 is provided, with which a shock-free crossing of the position gap 45 can be achieved, owing to the fact that, during the motion of the guiding carriage 14, bracing over at least four roller points is ensured. In this way, the tube package 2 does not experience any slipping or sliding due to a shock-free course of motion.

For driving the guiding carriage 14 continuously, a driving mechanism 54 (FIG. 9) is provided in the region of the upper stanchions 52, 53 which, by means of a chain 57 or the like and a front guide roller 58, initiates the respective horizontal motion of the guiding carriage 14 free of shock-like movements.

Figure 10:
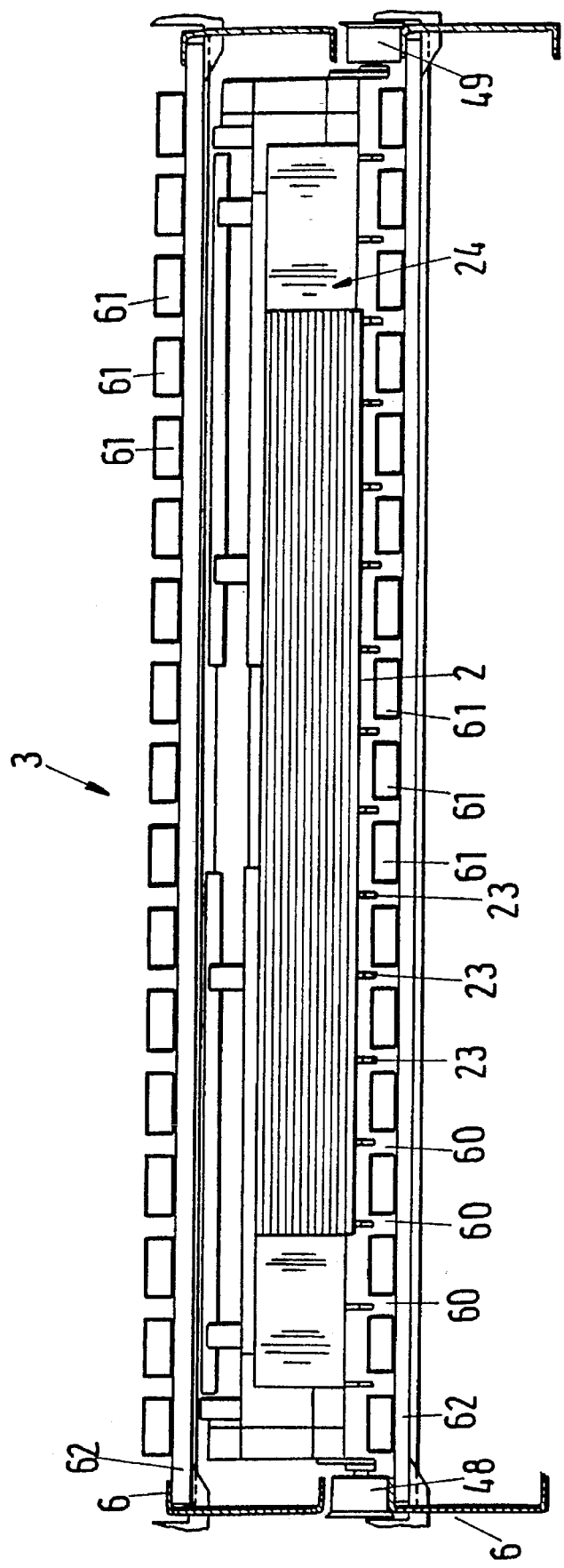
FIG. 10 shows an enlarged sectional representation of the process of pushing in the tube package between two supporting bases of the multideck pallet, along a line X—X of FIG. 6.

The sectional representation of FIG. 10 illustrates the process of pushing in the tube package 2 between two supporting bases 6 of the pallets 3. The lifting prongs 23 of the lifting fork 24 are moveable in the region of a receiving gap 60 between respective supporting beams 61 of the supporting base 6 in the loading position. In an appropriate embodiment, each supporting base 6 is provided below the supporting beams 61 with a compression plate 62, which can be controlled individually after the supporting bases 6 are loaded and, after being lowered onto the tube package 2, makes a compression of the tube sections possible.

Figure 11:
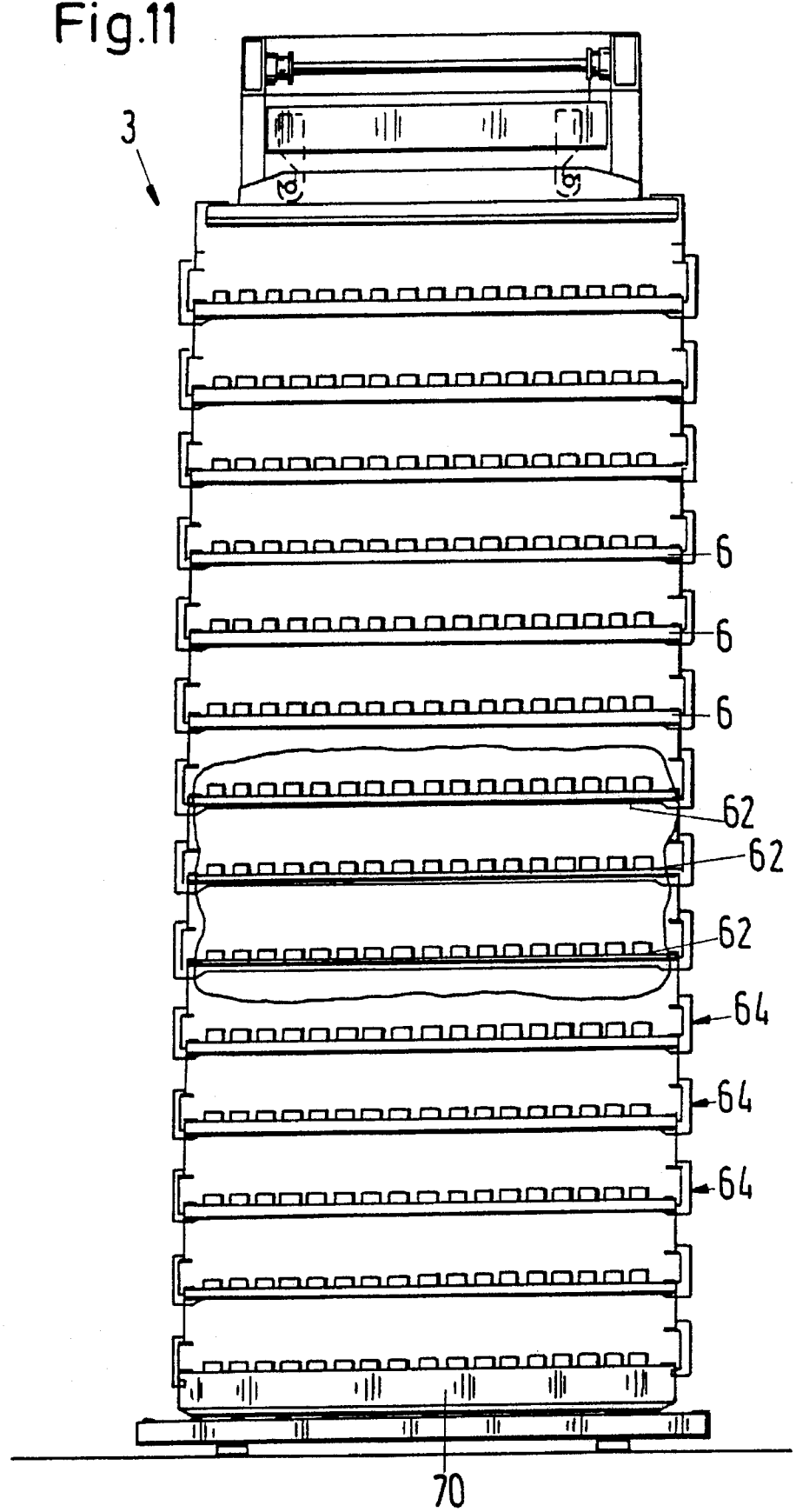
FIG. 11 shows an enlarged front view of the multideck pallet in the untilled state after the palletizing equipment has been moved in, along a line XI—XI of FIG. 1.
Figure 12:
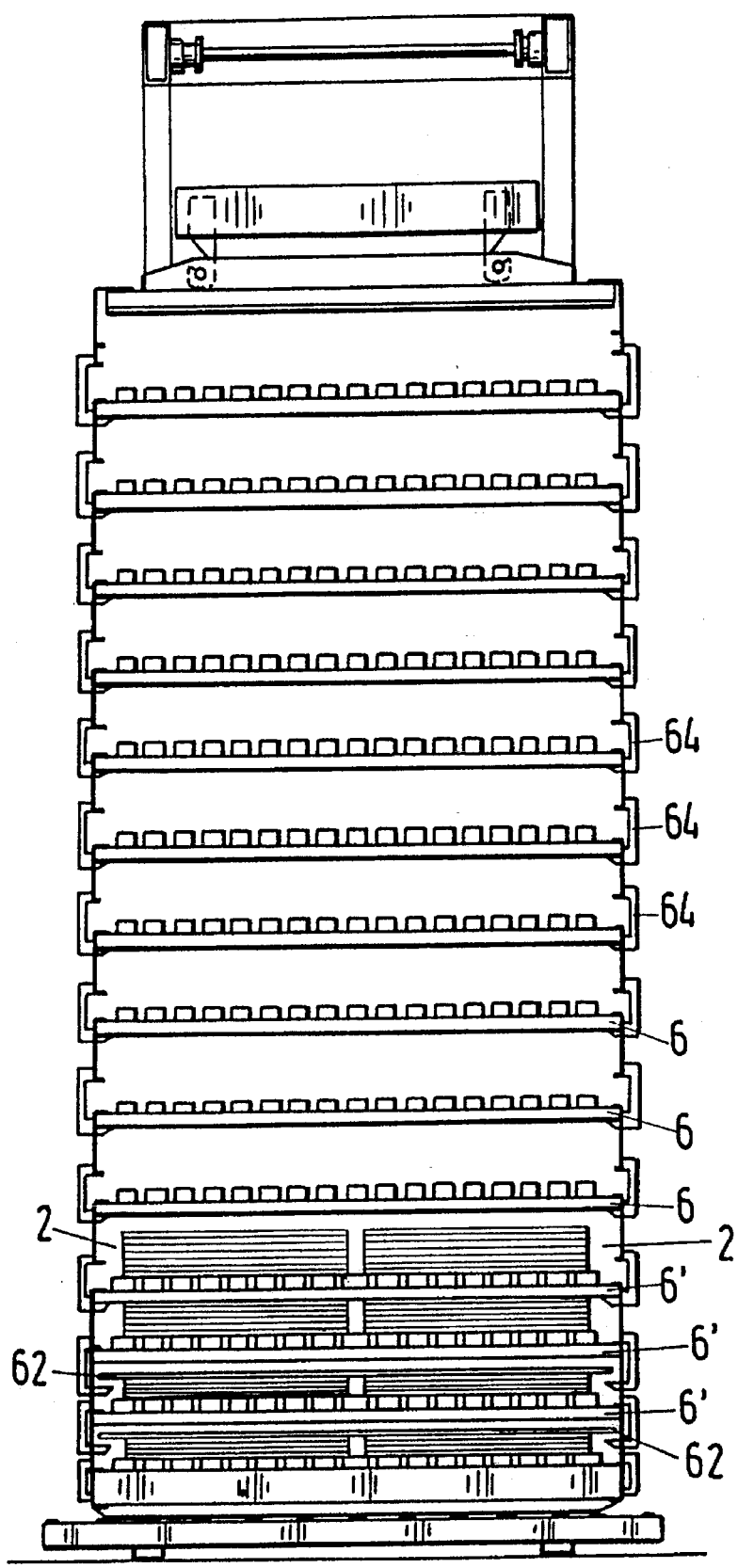
FIG. 12 is a representation similar to that of FIG. 11, with the pallet filled in the region of the lower supporting bases.
Figure 13:
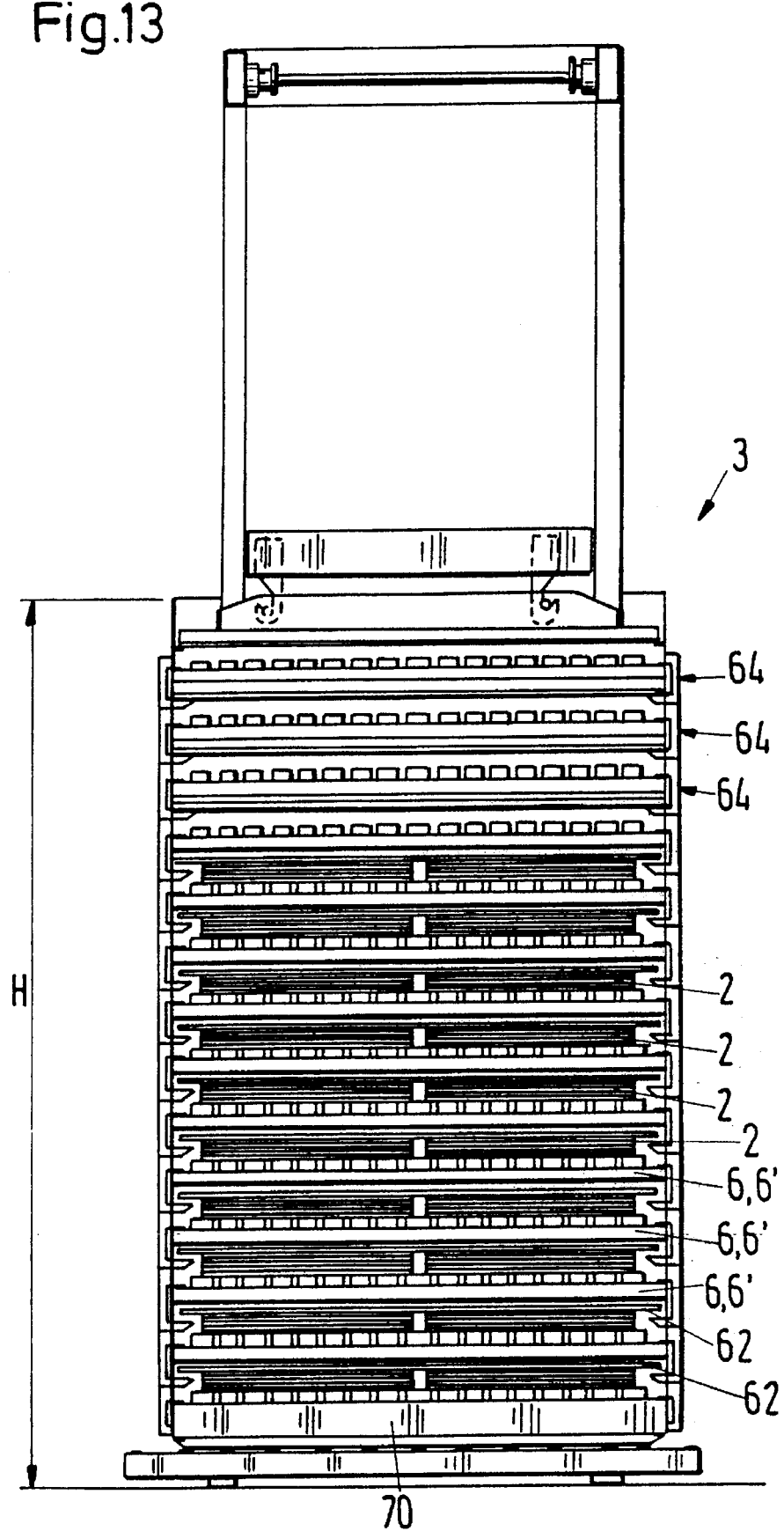
FIG. 13 is a representation similar to that of FIGS. 11 and 12, with the pallet in a filled state and with lowered supporting bases for removal from the palletizing apparatus.
Figure 14:
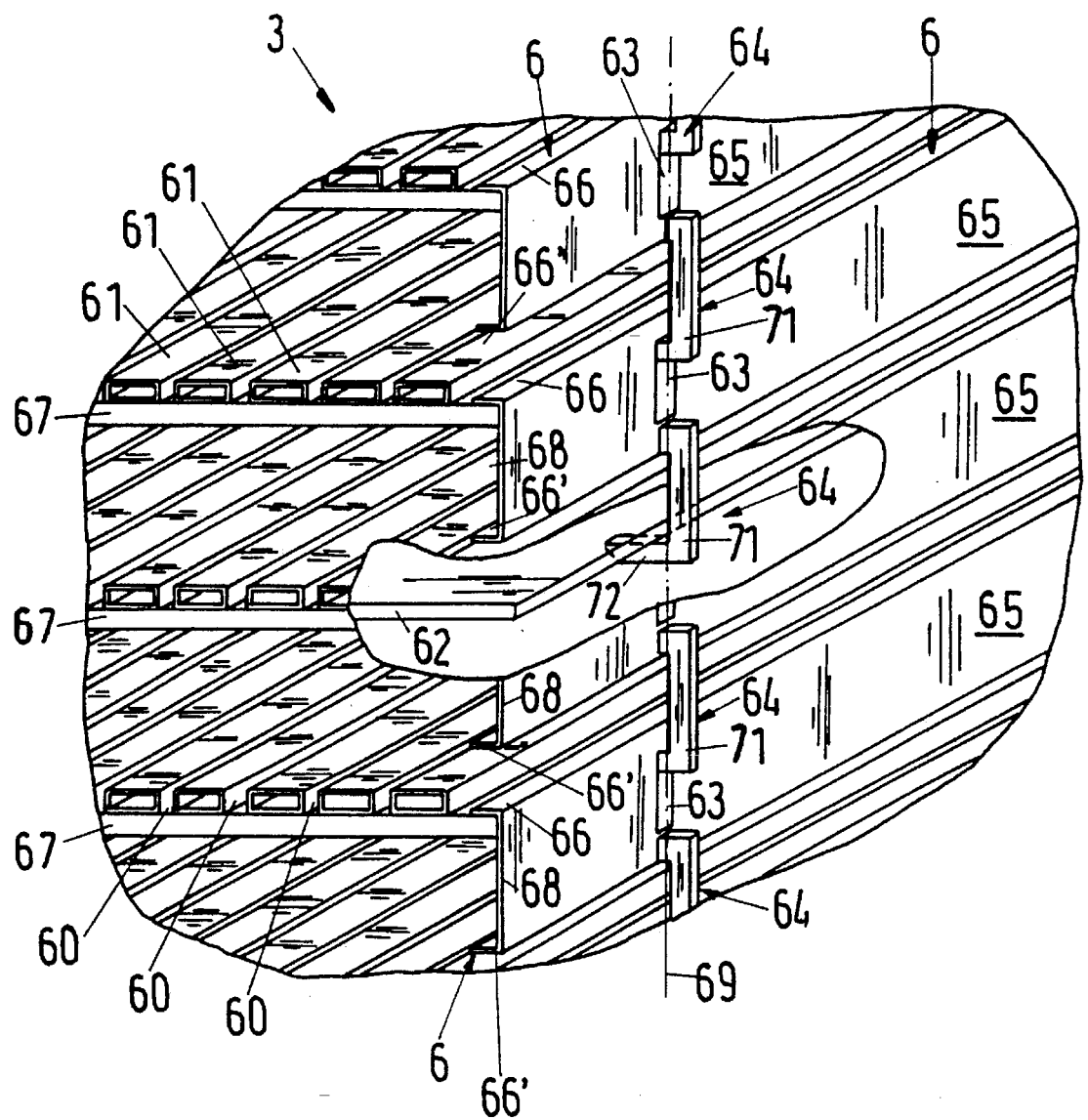
FIG. 14 shows an enlarged sectional representation of respective edge regions of the supporting bases with carrying and supporting brackets at the side.

To illustrate this compression, a first embodiment of the inventive multideck pallet 3 is shown in detailed representations in FIGS. 11 to 13. The supporting bases 6, 6' of the pallet 3 are connected with one another by lateral carrying and supporting brackets 64, the heights of which can be adjusted in vertical, lateral guide slots 63 of the supporting bases 6, 6' (FIG. 14). At the same time, the brackets 64 releasably support a compression plate 62, which is assigned to each supporting base 6, 6', for resting and exerting pressure on the tube package 2 (FIGS. 15 to 17).

The enlarged sectional representation of FIG. 14 illustrates the appropriate construction of the supporting bases 6, 6' with lateral U-shaped beams 65, the respectively upper leg 66 of which, over two cross beams 67, supports the supporting beams 61, between which the installation gap 60 is left. The guide slots 63 as well as the brackets 64 are disposed in a common supporting plane 69 on the basic crosspiece 68 of the U-shaped beam 65. The guide slots 63 are emended as far as the region, in which the basic crosspiece 68 and the bracket 63 are connected, so that, in the respective storage position of the pallet 3 (FIGS. 17 and 13) adjacent U-shaped beams 65 can be supported on one another and, with that, the pallet 3 in the loaded state has adequate stability for transporting.

In an appropriate embodiment, the brackets 64 (FIG. 14) are in each case constructed as L-shaped carrying hooks 71, the free leg 72 of which protrudes between the adjacent supporting bases 6, 6' with a depth of engagement corresponding to the length of the leg 66 of the U-shaped beam 65 (FIGS. 15 to 17), so that the available supporting surface in the region of the supporting beam 61 of the respective supporting base 6, 6' does not experience significant limitations.

A comparison of the height of the pallet in the untilled state of FIG. 11, in which it is moved into the palletizing equipment 1, with the stack height of the pallet 3 on leaving the palletizing equipment 1, as shown in FIG. 13, makes it clear that, after it is lowered into the storage position, the pallet 3 has an overall height H, which can be moved safely even under confined space conditions and can be adapted by means of the number of supporting bases 6, 6' to the respective application case.

With the sectional representations of FIGS. 15 to 17, the process of covering the pallet 3 (uncovered supporting base: 6, covered supporting base, 6') is illustrated, the bases being covered, starting out from a lower supporting plate 70 of the pallet 3, consecutively and progressively upwards. The compression plate 62, respectively assigned, comes to lie on the tube package 2 only when the supporting base above is covered and lowered so that its respective bracket 64 releases the compression plate 62 (FIG. 17).

Figure 18:
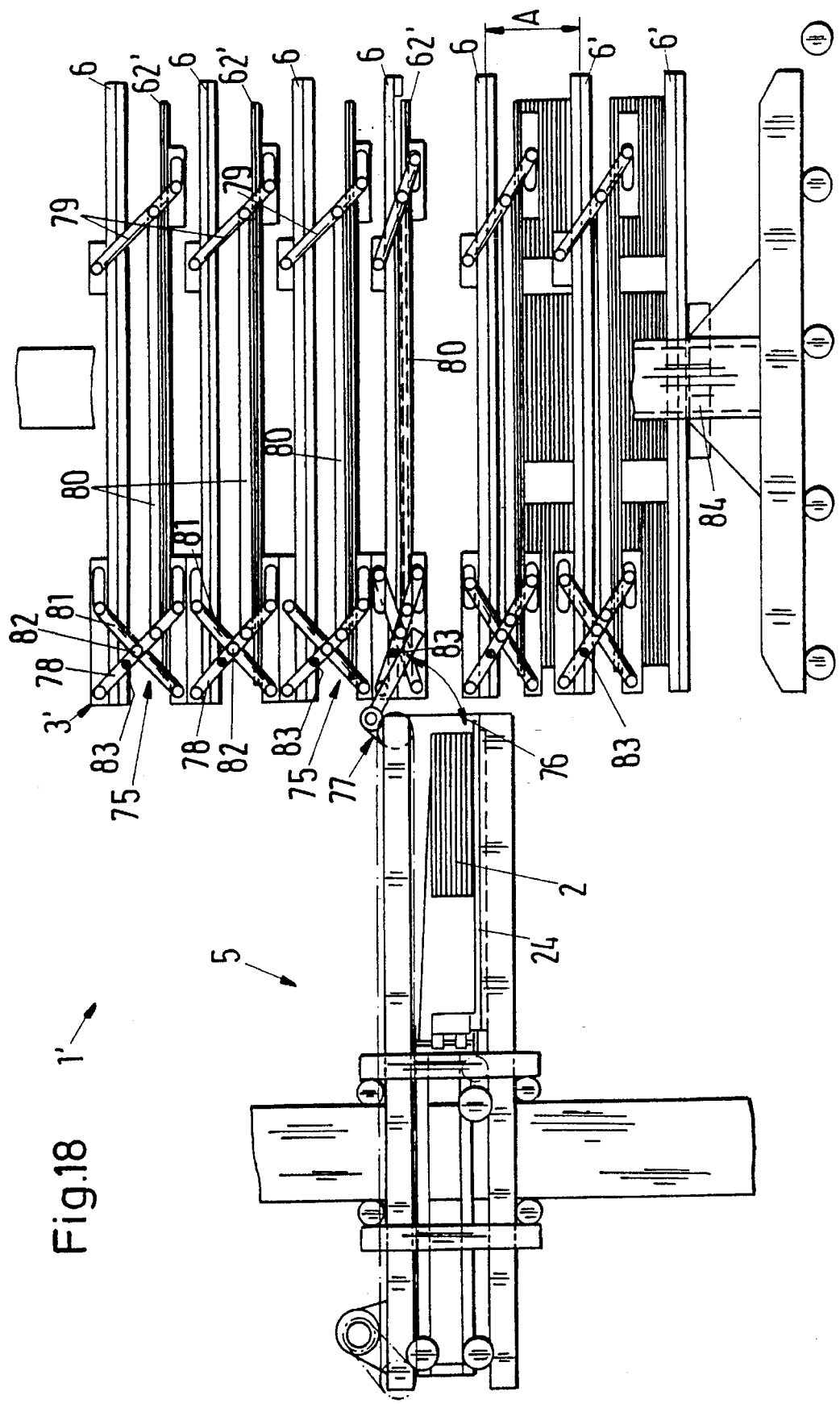
FIG. 18 shows a partially sectional side view of the palletizing equipment with a multideck pallet in a second embodiment with, in each case, individually movable compression plates in the region of the supporting bases.

FIG. 18 illustrates a second embodiment of the palletizing equipment 1. The multideck pallet 3', assigned to the loader 5, is provided with supporting bases 6, the assigned compression plates 62' of which are supported in the pallet 3' over holding equipment 75 above the respective supporting base 6 and are movable in the vertical direction. The relative positioning of the loader 5 and the pallet 3' that is shown makes it clear that the compression plate 62', for the introduction of the tube package 2 on the lifting fork 42 by means of a lifting element 77 on the loader 5, can be raised into a release position corresponding to the arrow direction 76. After that, the compression plate 62' can be lowered in the direction of the respective supporting base 6' into the compression position.

In an advantageous embodiment, the holding equipment 75 is provided at least with a front and a rear swiveling arm 78, 79, each of which is connected at one end pivotably with the compression plate 62' and, at the other end, is supported pivotably at the supporting base 6. At the same time, an operative connection is formed over a common guide rod 80 located between the two swiveling arms 78, 79. Said guide rod 80 makes a uniform lifting motion of the compression plate 62' possible.

In the embodiment shown, the holding equipment 75 is provided in the region of the front swiveling arm 78 with an additional supporting arm 81, which forms over a joint 82 a scissors mechanism with the swiveling arm 78. This mechanism makes a particularly smooth and motionally stable holding of the respective compression plate 62' possible.

To initiate the motion of the compression plate 62', a stay bolt 83, which can be brought into supportive engagement with the lifting element 77 on the loader 5, is provided in an appropriate embodiment at the swiveling arm 78 of the scissors mechanism. Depending on the respective direction of motion of the loader 5, a swiveling motion (arrow 76), acting as a lifting motion of the compression plate 62', can be imparted to the swiveling arm 78, 79.

The multideck plate 3', with the compression plates 62', which can be raised and lowered individually over the holding equipment 75, is particularly suitable for smaller storage capacities with frequently changing supporting patterns, the supporting bases 6 of the pallet 3' in an appropriate embodiment being braced positionally stably at a common frame 84, a constant distance A being formed between adjacent supporting bases 6. With this, an adaptation to customer-specific pallets 3' of different height can be achieved with little technical effort.

Figure 19:
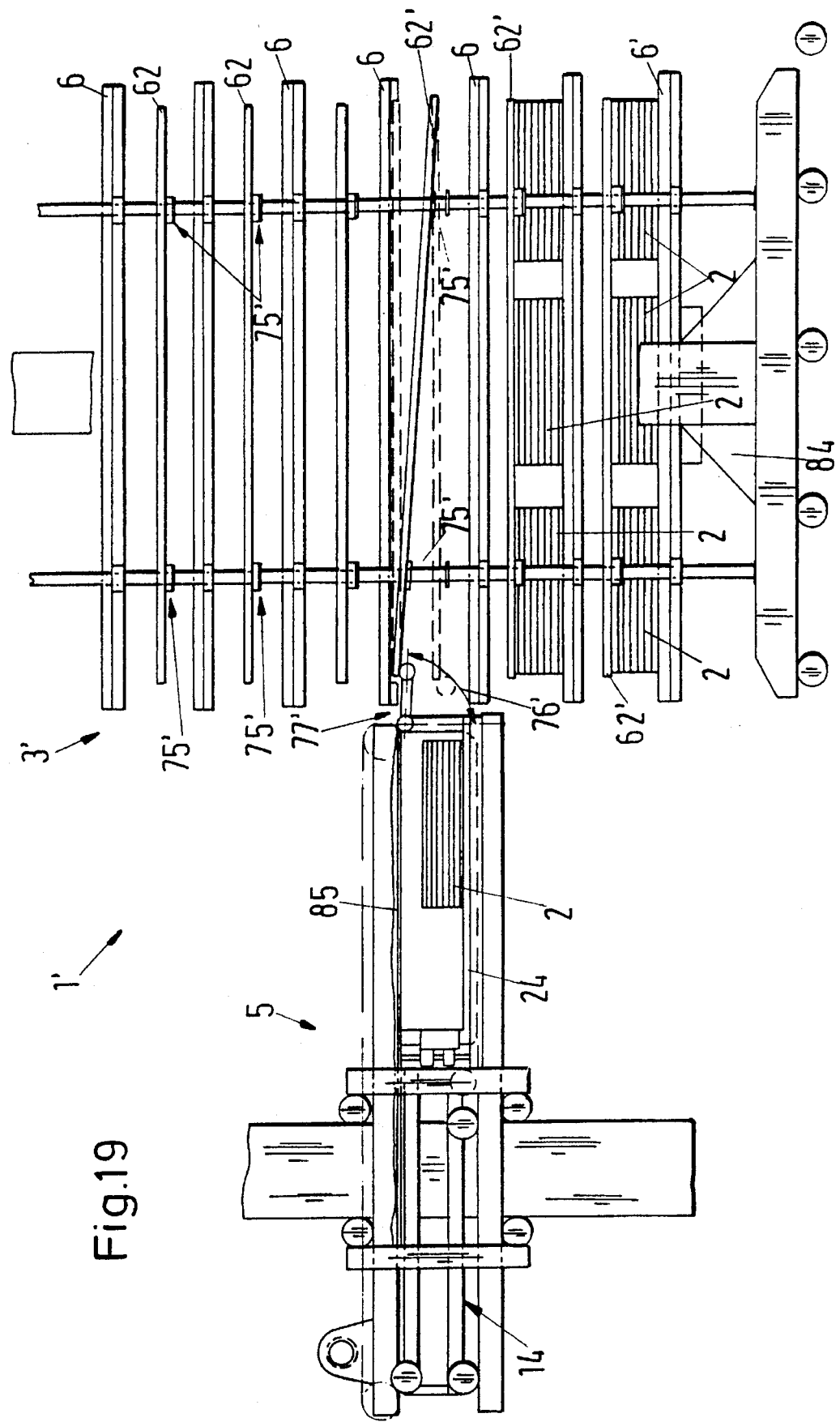
FIG. 19 shows a side view of the palletizing equipment similar to that of FIG. 18, with individually movable compression plates with a holding device in a second embodiment.

In FIG. 19, the multideck pallet 3', in an appropriate development, has holding devices 75' in the form of supporting elements, with which the respective compression plate 62' is supported in the inoperative position in such a way that, depending on the motion of the guiding carriage 14, the lifting element 77' brings about the inclined position of the compression plate 62' that is shown and, as the guiding carriage 14 is pushed further into the pallet 3', the compression plate lies on a supporting part 85. After the tube package 2 is deposited in the pallet 3', the compression plate 62' settles on the package 2 synchronously with the return motion of the guiding carriage 14. At the same time, the compression plate 62' is guided in the interacting components of the holding-device 75' in such a way, that a straight-edged compression of the tube package 2 can be achieved.

Figure 20:
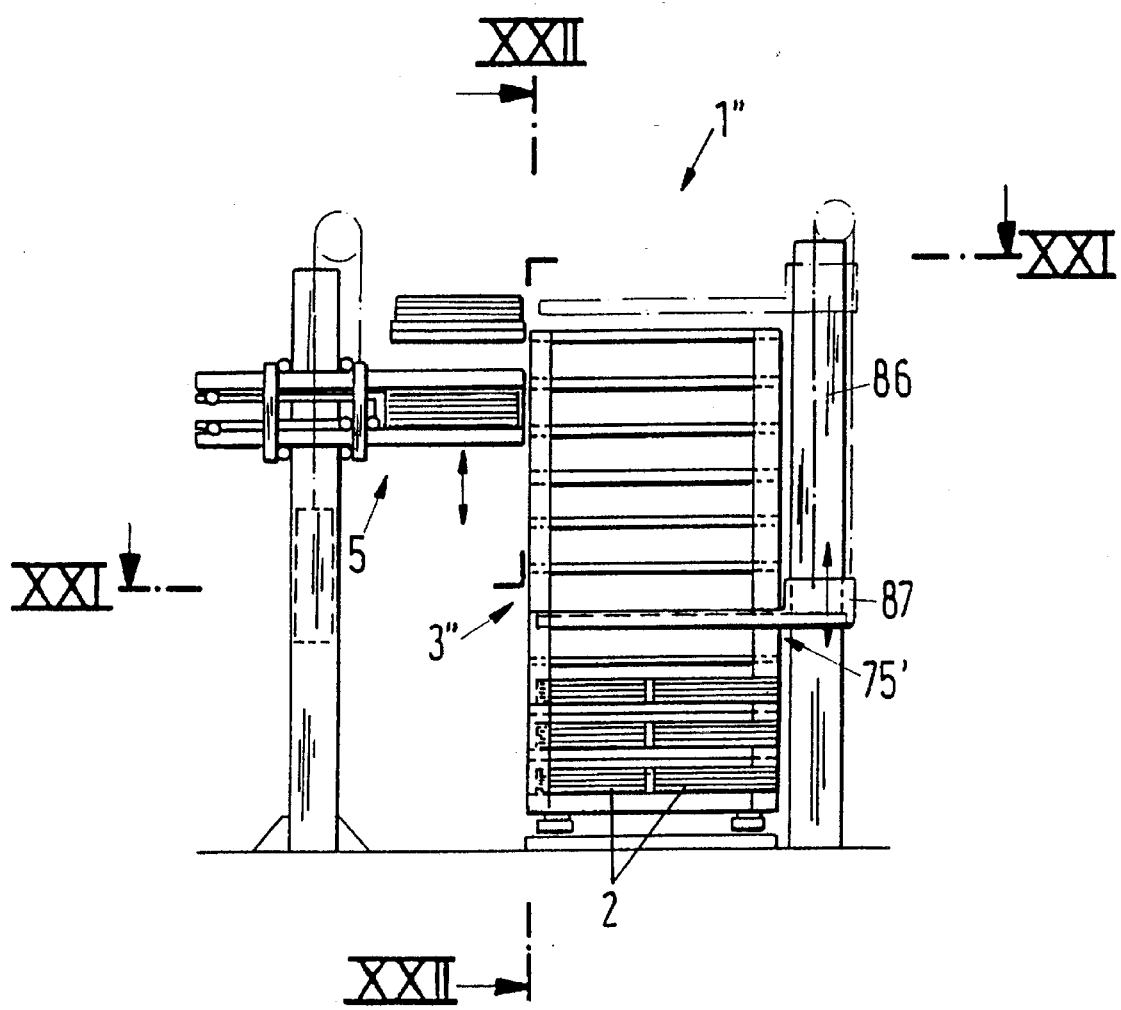
FIG. 20 shows a side view to the palletizing apparatus, with a third embodiment of the multideck pallet with external lifting elements moving the compression plates.
Figure 21:
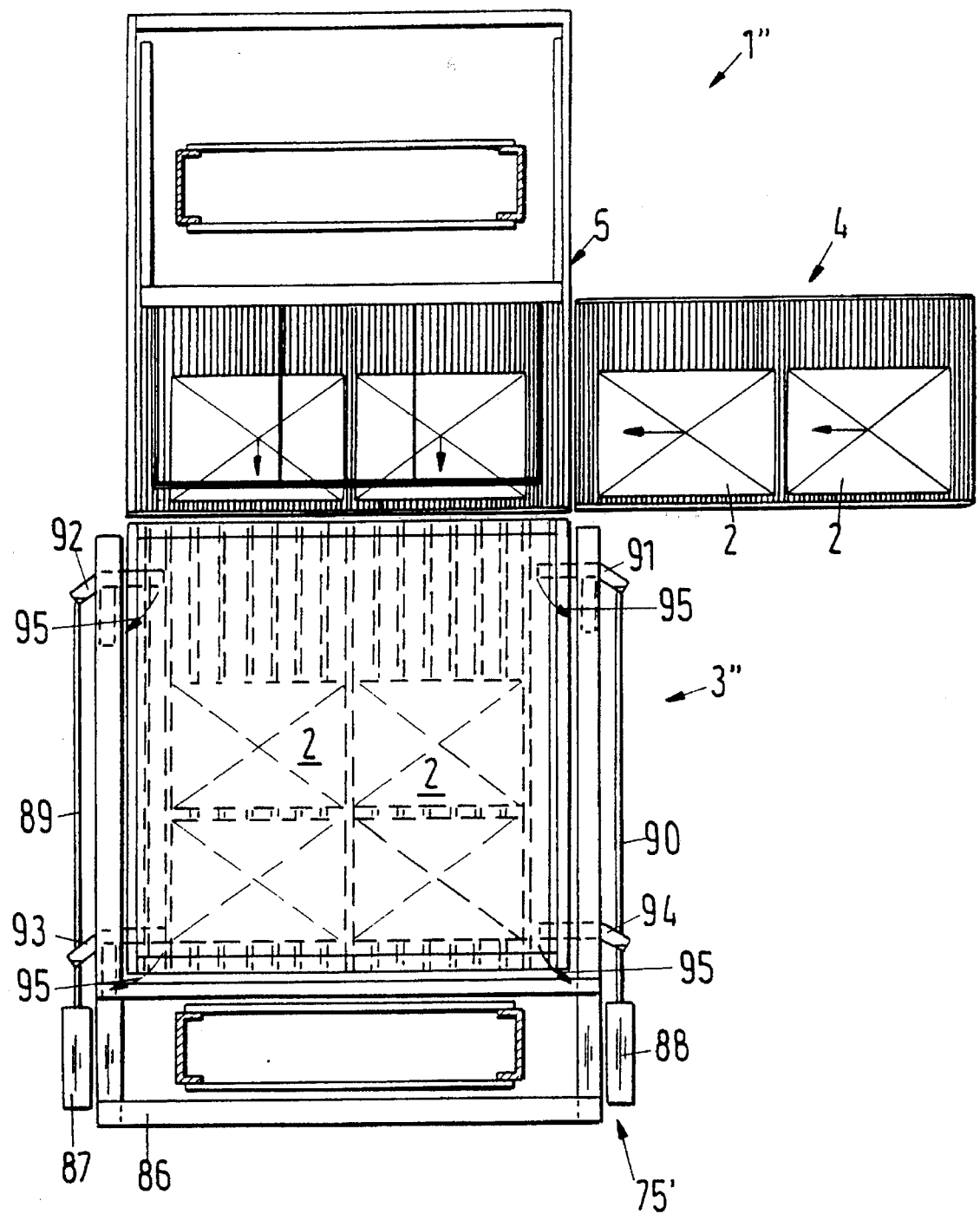
FIG. 21 shows a partially sectional plan view of the palletizing apparatus along a line XXI—XXI of FIG. 20.

In FIG. 20, a third embodiment of the palletizing apparatus 1" is shown, the multideck pallet 3" of which is provided with lifting equipment 75', which is assigned to the respective compression plate 62' of the supporting bases 6 (FIG. 22) and has two lifting arms 89, 90, which are assigned by way of a guide frame 86 to the respective supporting base 6 of the pallet 3" that is to be filled and can be moved over respective height-adjustable lifting elements 87, 88 (FIG. 21).

Figure 22:
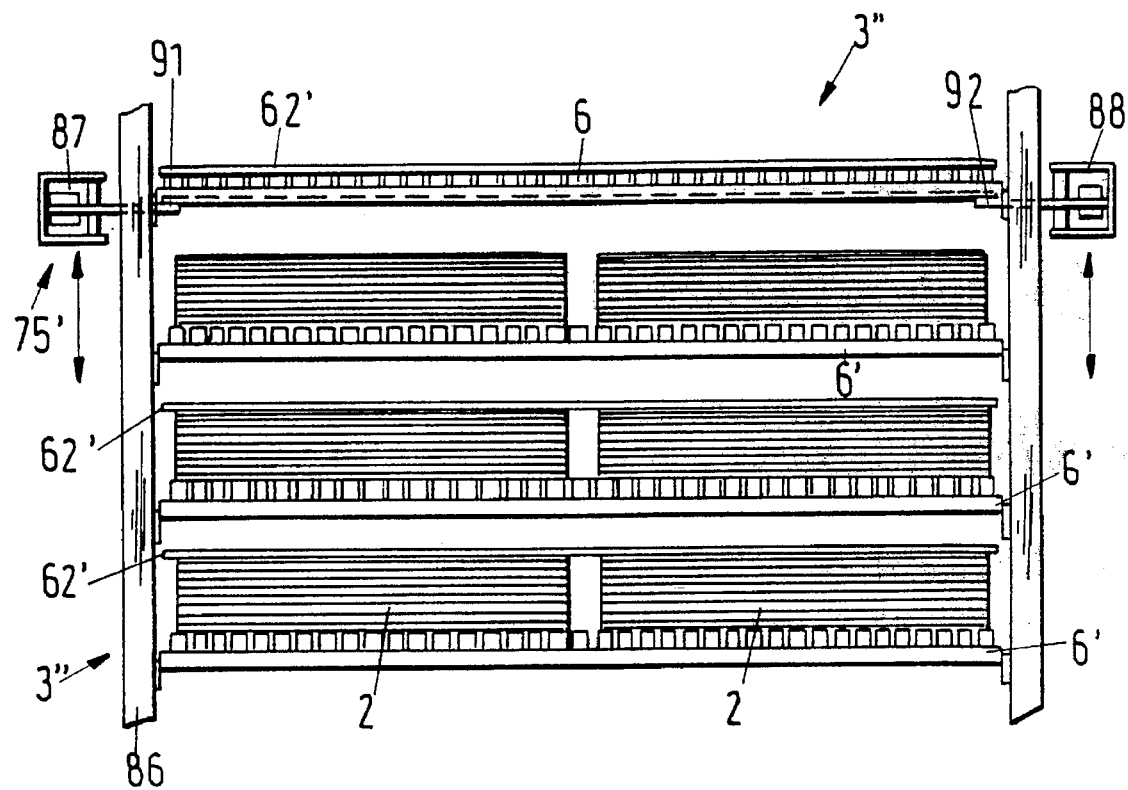
FIG. 22 shows a partially sectional front view of the pallet along a line XXII—XXII of FIG. 20.

In an appropriate embodiment, the lifting arms 89, 90 are provided with hinged fingers 91, 92 or 93, 94, which are disposed opposite one another in pairs, can be swiveled laterally between the supporting bases 6 and moved by way of a synchronous process (arrow 95) between the supporting bases 6 in such a way, that the respective compression plates 62' can be lifted individually into the release position shown in FIG. 22. Immediately after the respective supporting base 6' is covered, a controlled lowering of the assigned compression plate 62' onto the respective tube package 2 can be carried out and, with that, a delay-free compression of the tube package 2 is achieved.

Figure 23:
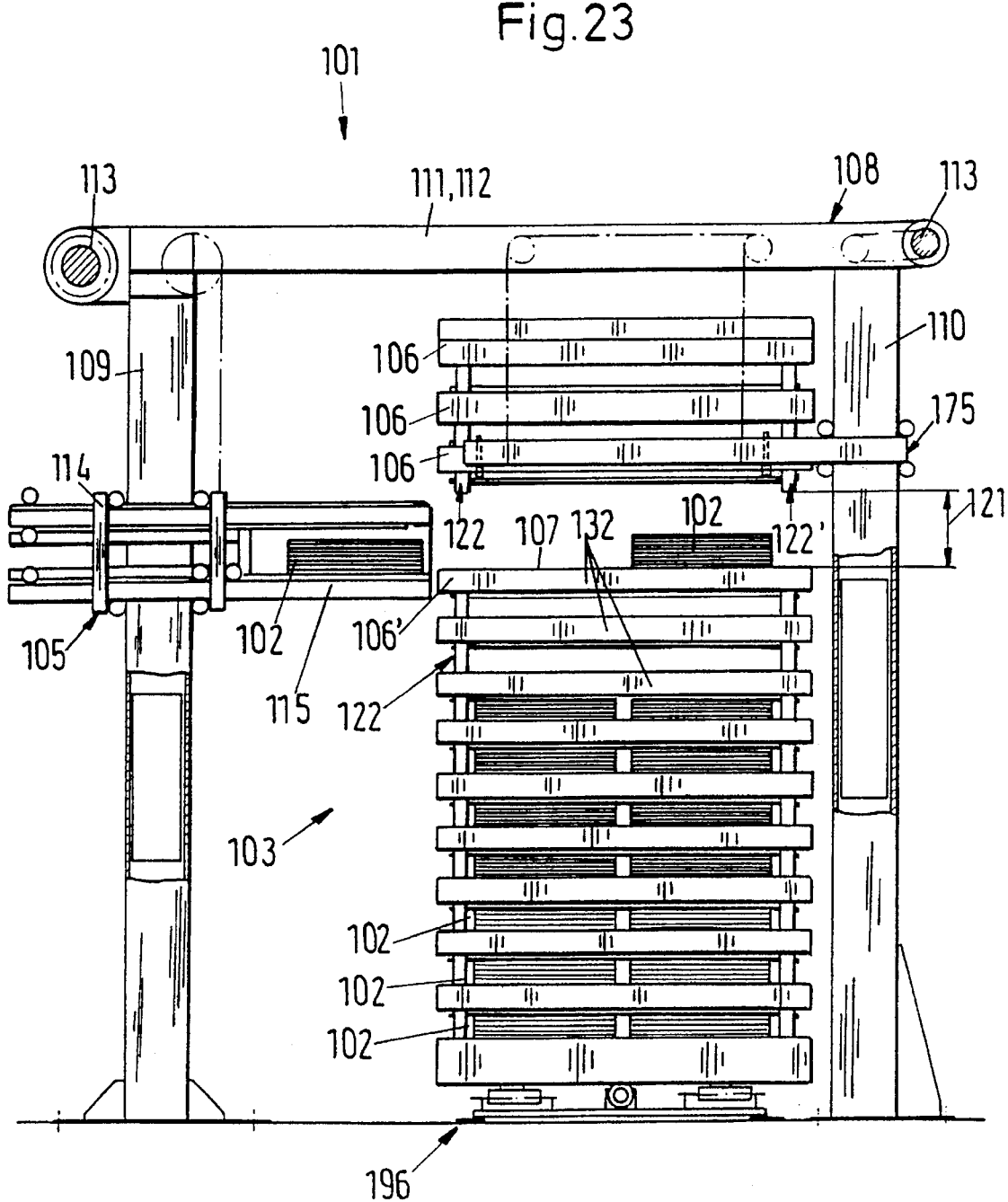
FIG. 23 shows a side view of the palletizing apparatus in a fourth embodiment with multideck pallet of unconnected supporting bases in the region of loader.

In FIG. 23, a fourth embodiment of the palletizing apparatus, which is labeled 101 as a whole, is shown, by means of which the respective tube sections can be brought in the form of tube packages 102 into a multideck pallet 103. By means of a loader 105, the tube packages 102 are moved between a raised supporting base 106 and a supporting base 106', which is in the receiving position, and deposited on the latter in the region of a stacking surface 107.

The palletizing apparatus 101 is provided with a frame 108, at the vertical stanchions 108, 109, 110 of which on the one hand the loader 105 and, on the other, the pallet 103 is height-adjustably braced, respective driving mechanisms 113 for initiating the movement being provided in the region of the upper transverse spars 111, 112.

For receiving the tube package 102, the loader 105 has a guiding carriage 114, which can be moved vertically at the vertical stanchion 109 of the loader 108 and on which the tube package 102 on a comb-like receiver 115 can be brought into the position shown, in which it horizontally faces the respective supporting base 106' (FIG. 23).

Figure 24:
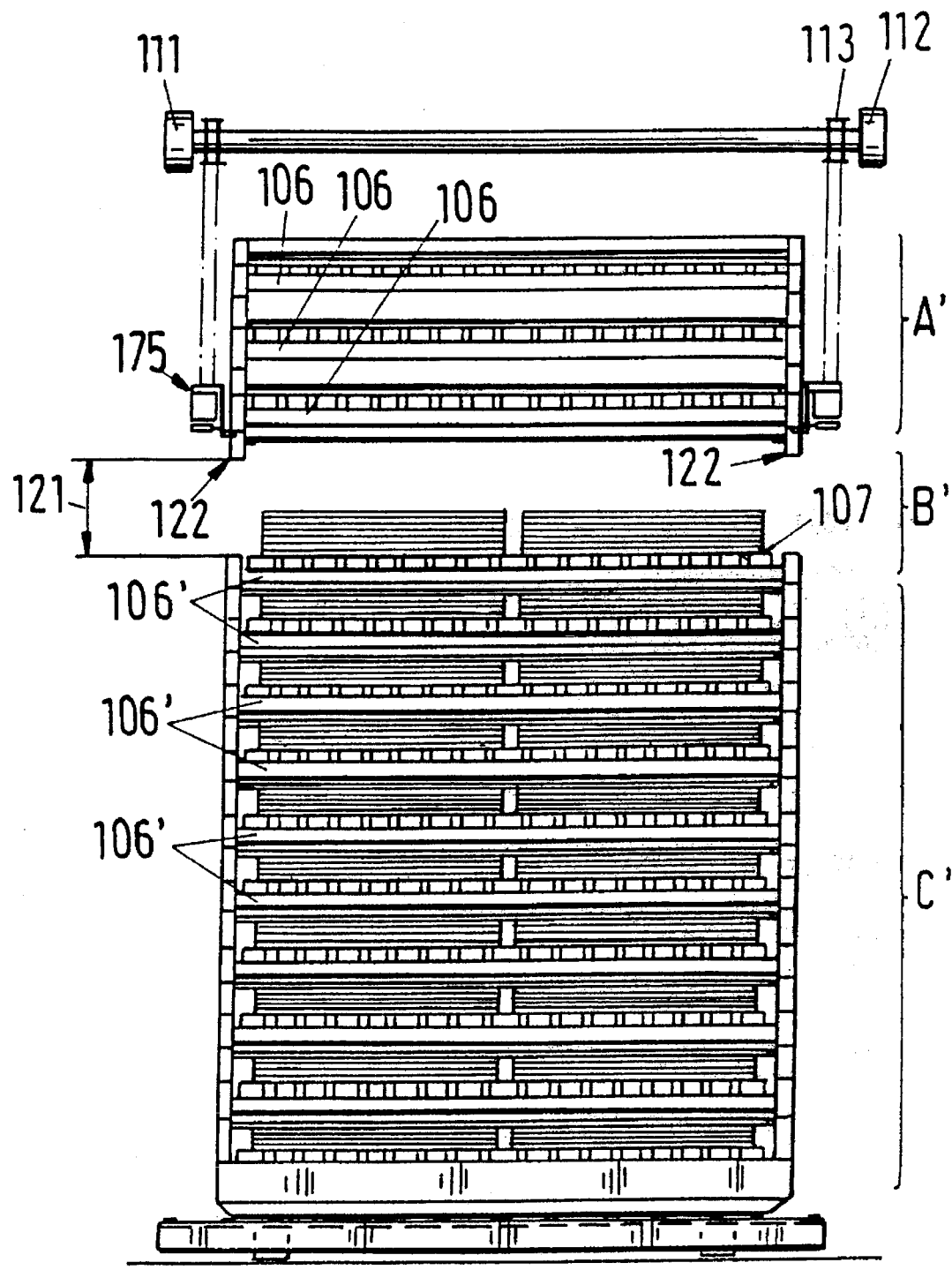
FIG. 24 shows a side view of the multideck pallet along the line II—II of FIG. 23.

In an advantageous development, the multideck pallet 103 is formed from a vertical tower of mutually unconnected supporting bases 106, 106', which can be moved individually from an uncovered stack position A' over the receiving position B' into the storage position C', lifting equipment 175 for the supporting bases 106 in the raised stack position C' being braced height-adjustably in the region of the vertical stanchion 110 in such a manner, that a clearance 121, freely passable for the introduction of the loader 105 or the tube package 102 can be formed (FIG. 24).

Figure 25:
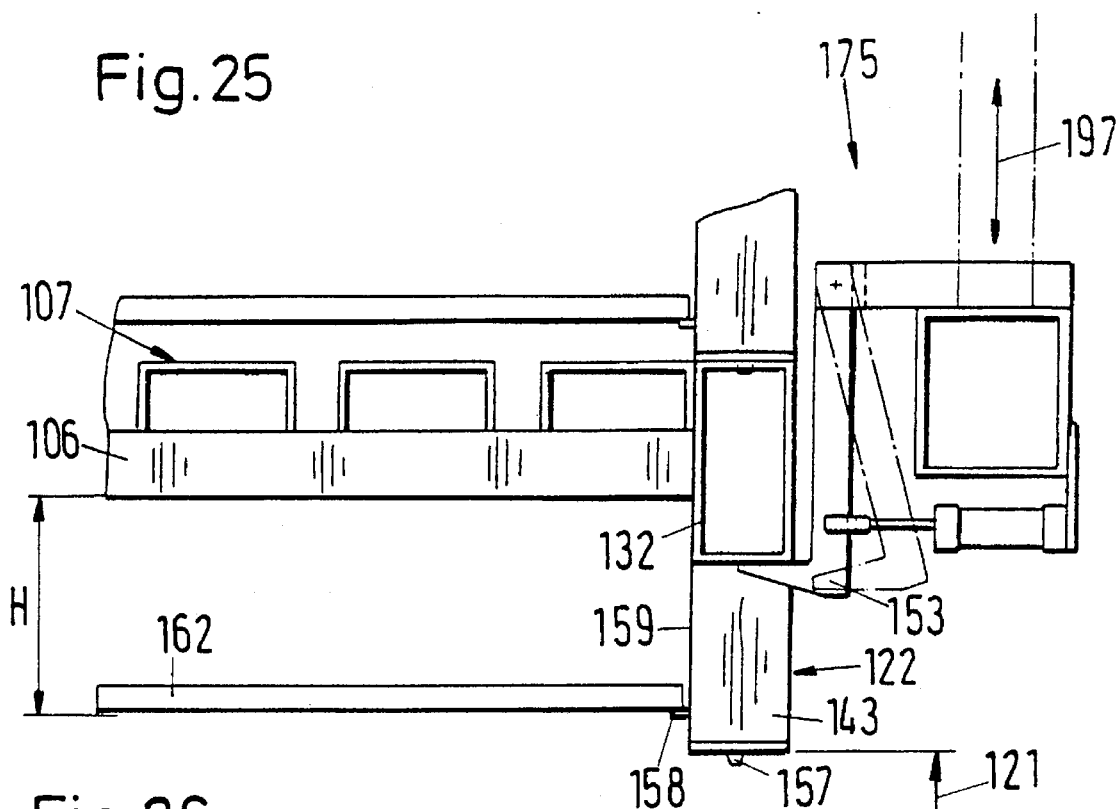
FIG. 25 shows an enlarged sectional representation in the region of a lifting device grasping below a supporting base.
Figure 26:
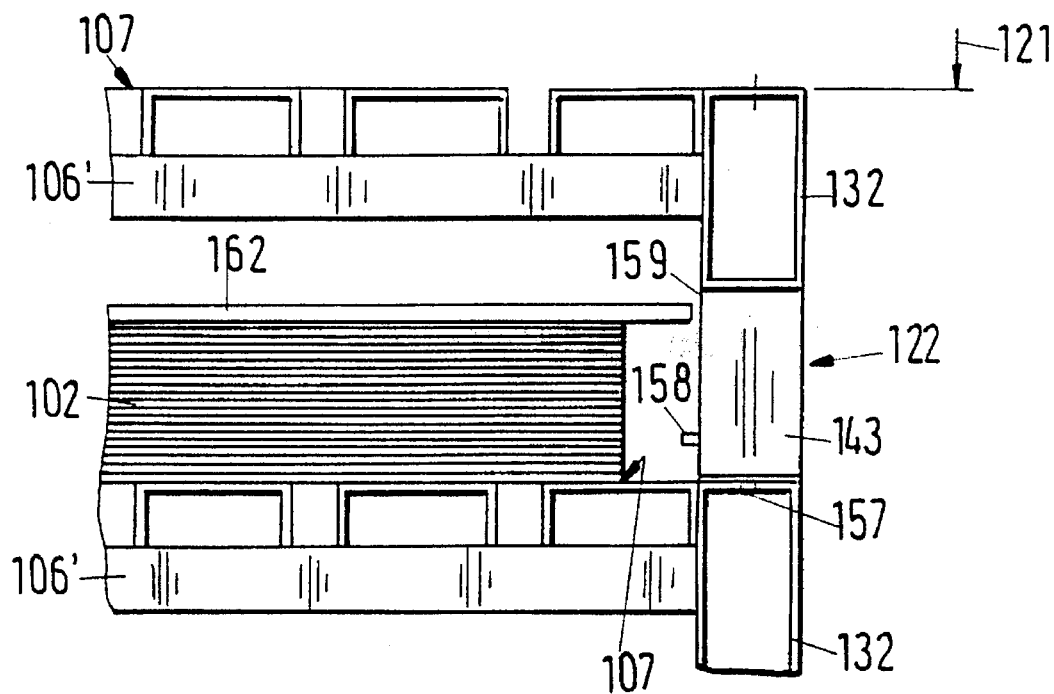
FIG. 26 shows an enlarged sectional representation of two supporting bases supported on one another in the edge region.

Looking at FIGS. 25 and 26 together makes it clear, in an enlarged representation, that a compression plate 162, which is automatically releasable and is assigned directly to the next lower supporting base 106' (FIG. 26), which has previously been brought into its storage position C', so that it may rest compressively on the tube package 102, is at once braced at each individual supporting base 106 or 106'. The supporting bases 106' are held in this storage position C' in a direct, mutually supporting engagement.

In an appropriate version, the supporting bases 106, 106' are provided with the stacking surface 107, which is constructed in the shape of a rectangular parallelogram and has, at least in the region of two opposite side edges, vertical supports 122, 122', which can be brought into supportive engagement. In the embodiment of the palletizing apparatus 101 of FIGS. 23 to 27 shown, the supports 122, 122' are formed in each case by supporting feet 143 disposed in pairs at a longitudinal beam 132 of the supporting bases 106, 106'. For bracing the supporting bases 106, 106' positionally stably (FIG. 26), the supports 122, 122' are provided at their respective free end with at least one vertical positioning pin 157, which engages the supporting base below.

Furthermore, in FIGS. 25 and 26, the propping of the compression plate 162, which can be lifted off freely in the vertical direction, is shown, this compression plate 162 being held by rests 158 offering a horizontal supporting surface at mutually opposite pairs of inner sides 159 of the vertical supports 122, 122'. Advisably, the rests 158 are disposed in the lower end region of the vertical supports 122, 122', so that, with that, a receiving space H for the compression plate 162, which is adaptable to different stack heights of the tube sections, is left.

Figure 27:
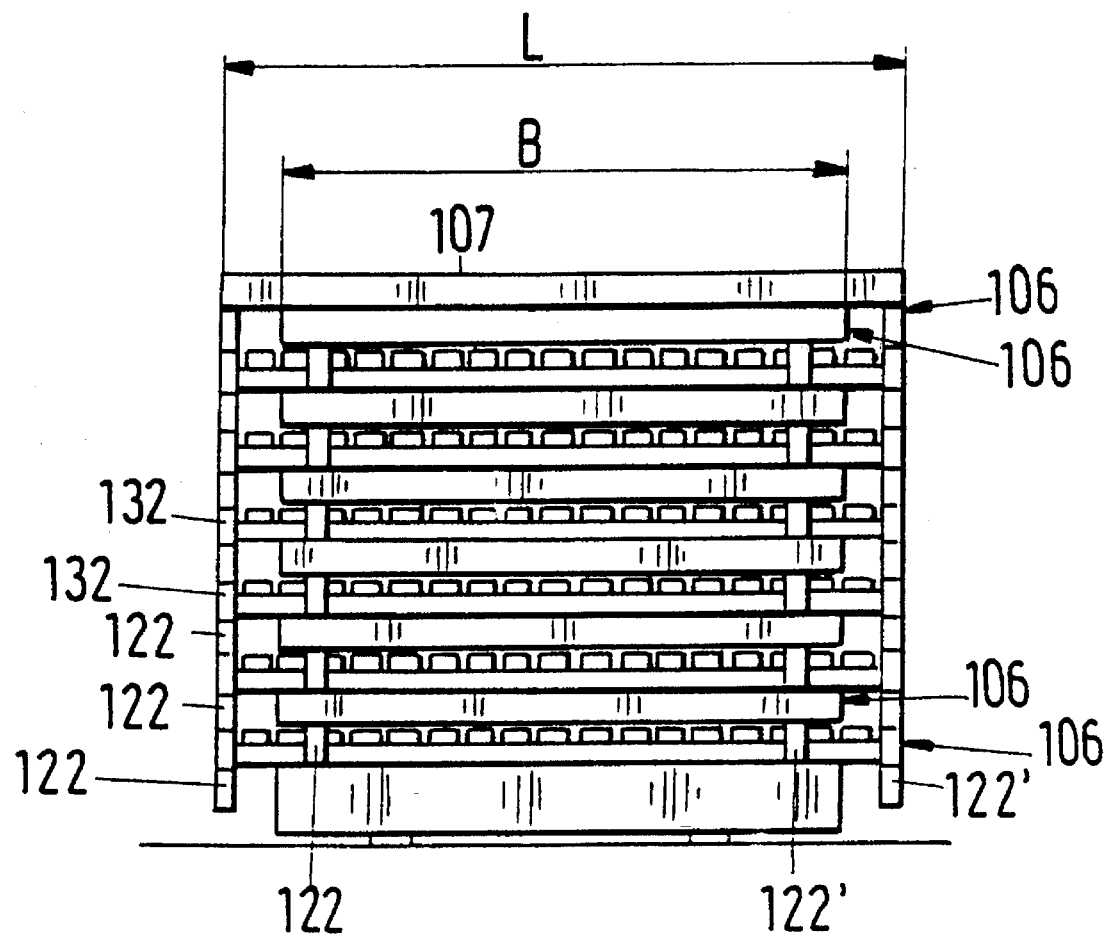
FIG. 27 shows a side view of the supporting bases with a rectangular stacking surface in an uncovered stacking position.

In FIG. 27, a space-saving stacking position of the supporting bases 106 is shown, which is applicable particularly for transporting empty supporting bases, the rectangular contour of which, which is defined by the length L and the width B, makes it possible to stack the unconnected supporting bases into a tower. In the embodiment shown, the supporting bases 106 are disposed offset to one another in each case by 90° and deposited on one another in the vertical direction in the stacking position in such a manner, that a space-saving transport is possible. For use in the palletizing apparatus 101 (FIG. 23), the supporting bases 106 can be restacked into the operating position shown, in which they can be transported on a floor conveyor 196, in such a manner, that the previously described loading can be achieved at high speed by means of the lifting equipment 175 and the loader 105.

Figure 28:
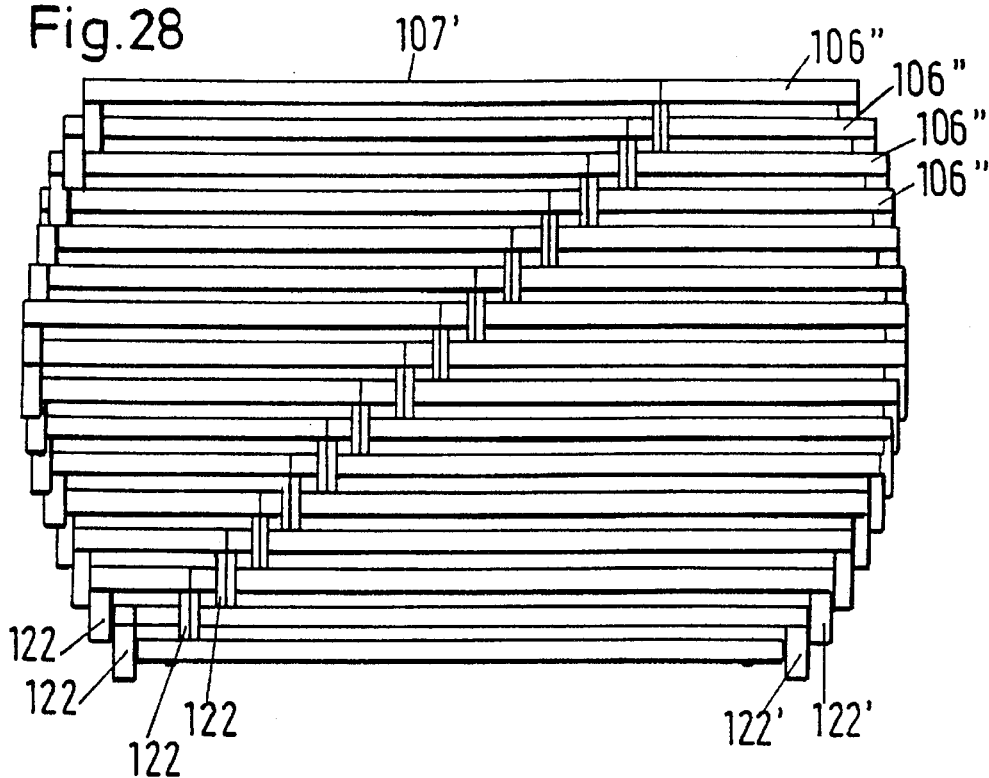
FIG. 28 shows a side view similar to that of FIG. 27 with square supporting bases.
Figure 29:
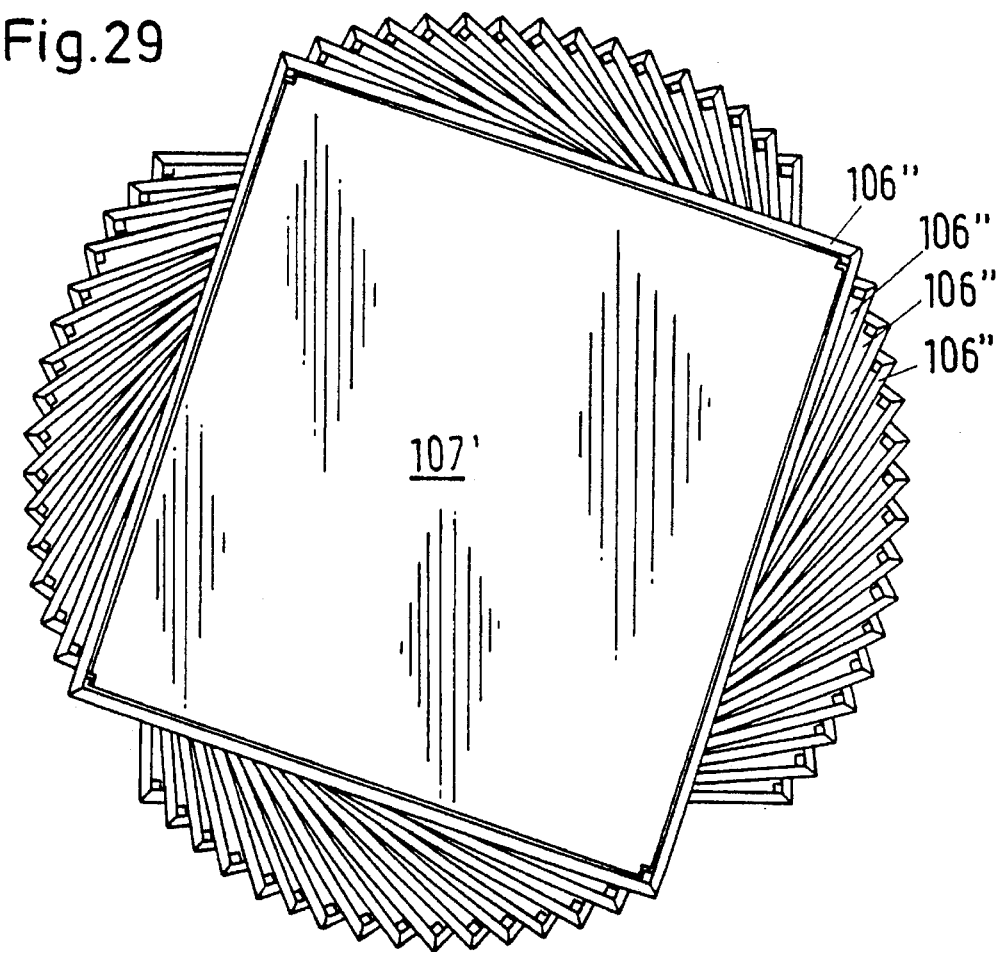
FIG. 29 shows a plan view of the stacking of FIG. 28.

In FIG. 28, the stacking surfaces 107' of the supporting bases 106" in a second embodiment are in each case square, so that, for transporting the unloaded supporting bases 106", a stacking position without gaps in the vertical direction is achieved for these bases 106", owing to the fact that they are deposited on one another in each case rotationally offset by one vertical axis and the respective supports 122, 122' protrude freely downward (FIG. 29).

In FIG. 25, the enlarged sectional representation of the lifting equipment 175 illustrates that this lifting equipment 175 grips underneath the longitudinal beam 132 forming an engagement part in the region of at least one side edge of the respective supporting base 106 with an operating element 153 constructed as a pivoted lever in such a manner, that individual or also several supporting bases 106 can be raised or lowered simultaneously in the lifting direction 197 and the loading process or the stacking is possible with simultaneous lowering of the compression plate 162 onto the tube package 102.

The apparatus described above can also be used for depalletizing tube packages 102 with the opposite course of motions and without additional aids.

We claim:

1. Apparatus for palletizing tube packages comprising:
a frame means:
   a loader means on said frame means receiving said tube packages to be palletized;
a multi-deck pallet means supportable by said frame means and comprising a plurality of superimposed pallet units, each of said pallet units being movable relative to a juxtaposed superimposed pallet unit between a moved-apart position and a moved-together position;
   said loader means comprising a receiving surface which receives said tube packages and a lifting means comprising a plurality of lifting prongs, said lifting means being vertically moveable between a lowered position and a raised position, said lifting means when in said lowered position disposing said lifting prongs at an elevation lower than said receiving surface, said lifting means when in said raised position disposing said lifting prongs at an elevation higher than said receiving surface;
   said lifting means being horizontally moveable between a start position and a deposit position, said lifting means when in said start position being operable to raise said lifting prongs to said raised position to thereby lift said tube package from said receiving surface and thereafter to transport said tube package from said start position to said deposit position, said lifting means being operable to lower said lifting prongs to said lowered position when in said deposit position to thereby deposit said tube package on one of said pallet units, the overlying pallet unit overlying said one pallet unit being in said moved-apart position when said lifting means is in its deposit position;

said multi-deck pallet means further comprising a compression plate for each pallet unit;

said multi-deck pallet means further comprising operable means operable to separately dispose a compression plate in a compression position on the tube packages on each pallet unit after deposit of said tube packages on said pallet unit by said lifting means, each of said pallet units being disposed in said moved-together position when said compression plate is in said compression position.

2. Apparatus for palletizing tube packages according to claim 1 wherein said lifting means includes holding means engaging the tops of said tube packages disposed on said lifting means for holding said tube packages on said lifting means.

3. Apparatus for palletizing tube packages according to claim 2 wherein said holding means comprises a pivotal support and a holding part, pivot means pivotably supporting said holding part on said pivotal support for pivotal movement between a holding position in which said holding part engages said tube package on said lifting means and a non-holding position in which said holding part is separated from said tube packages on said lifting means.

4. Apparatus for palletizing tube packages according to claim 3 wherein said lifting means comprises operable means operable to move said lifting prongs between said lowered and raised position, actuating means operable to move said holding part from said holding position to said non-holding position, and a common drive means for effecting actuation of said operable means and said actuating means.

5. Apparatus for palletizing tube packages according to claim 4 wherein said common drive means comprises a cylinder having a piston rod, said operable means comprising a pivotably mounted pivot member having one end pivotably mounted to said piston rod, the other end of said pivot member mounting a transfer element, said lifting means having a transverse beam mounting spaced stops, said transfer element being engageable with said stops to effect movement of said lifting means between said raised and lowered position.

6. Apparatus for palletizing tube packages according to claim 5 wherein said operable means is provided with an abutment which is raised and lowered as said lifting means moves between said raised and lowered positions, said holding part having a stop, said abutment engaging said stop to move said holding part from said holding position to said non-holding position when said lifting means is moved from said raised position to said lowered position.

7. Apparatus for palletizing tube packages according to claim 1 herein said lifting means comprises a carriage, said loader means comprising a carriage support means, rollers supporting said carriage on said carriage support means, and drive means for driving said carriage on said carriage support means, said lifting means being carried by said carriage, said drive means being operable to drive said carriage between a start position and a transport position corresponding respectively to said start and transport position of said lifting means.

8. Apparatus for palletizing tube packages according to claim 7 wherein said rollers include forward rollers and rear rollers spaced from said forward rollers and lead rollers disposed juxtaposed to and forwardly of said forward rollers such hat when said lifter means is moved from said start position to said deposit position, said lead rollers initially roll off of said carriage onto said pallet unit followed by said juxtaposed forward rollers.

9. Apparatus for palletizing tube packages according to claim 1 wherein said loader means comprises positioning means operable to engage a pallet unit to be loaded to thereby fix the position of the loader means relative to said pallet unit.

10. Apparatus for palletizing tube packages comprising:

loader means receiving tube package to be palletized;

a multi-deck pallet means comprising a plurality of superimposed pallet units, said loader means being operable to load said tube packages onto said pallet units;

said pallet means comprising bracket means disposed between upper and lower juxtaposed pallet units, said bracket means being relatively movably disposed on one of said upper and lower juxtaposed pallet units such that said upper and lower juxtaposed pallet units are relatively moveable between a spaced-apart position and a moved-together position;

said pallet means comprising a compression plate for each pallet unit said bracket means for said upper and lower juxtaposed pallet units supporting said compression plate in a support position when said pallet units are in said spaced-apart position, said bracket means for said upper and lower juxtaposed pallet units releasing the compression plate onto the tube packages on the lower of the upper and lower juxtaposed pallet units when said upper and lower juxtaposed pallet units are in said moved-together position.

11. Apparatus for palletizing tube packages according to claim 10 wherein each of said pallet means includes a U-shaped beam member having a generally vertical beam base along with spaced upper and lower beam legs, said bracket means being disposed on the beam bases of said U-shaped beam members, the lower of said upper and lower juxtaposed pallet units being suspended from the upper of said upper and lower juxtaposed pallet units by said bracket means.

12. Apparatus for palletizing tube packages according to claim 11 wherein each of said pallet units comprises a support structure on which said tube packages are loaded by said loader means, the upper leg of each U-shaped beam being joined to the respective support structure of each pallet unit.

13. Apparatus for palletizing tube packages according to claim 12 wherein said support structure comprises a plurality of parallel and spaced support beams, cross beams supporting said support beams, said upper leg of said U-shaped beam being mounted on said cross beam.

14. Apparatus for palletizing tube packages according to claim 11 wherein the lower beam leg of one U-shaped beam member is supported on the upper beam leg of a juxtaposed lower U-shaped beam member when said pallet units are in said moved-together position.

15. Apparatus for palletizing tube packages according to claim 11 wherein said lower beam leg of said U-shaped beam member engages said compression plate with an engagement depth substantially equal to the length of said lower beam leg.

16. Apparatus for palletizing tube packages according to claim 11 wherein said bracket means comprises L-shaped bracket members each having a bracket leg and a bracket side, said beam base of said U-shaped beam member having elongated slots, said bracket legs being slidably received in said slots.

17. Apparatus for palletizing tube packages according to claim 16 wherein the bracket side of said L-shaped bracket is secured to the beam base of the upper of the U-shaped beam member of a pair of upper and lower juxtaposed pallet units, the bracket leg of the last said L-shaped bracket being slidably received in the slot of the beam base of the U-shaped beam member of the lower of said pair of upper and lower juxtaposed pallet units.

18. Apparatus for palletizing tube packages according to claim 10 wherein said pallet unit of said one of said upper and lower juxtaposed pallet units has elongated slots receiving said bracket means, said elongated slots and said bracket means being disposed in generally vertical rows in generally common supporting planes.

19. Apparatus for palletizing tube packages according to claim 10 wherein juxtaposed bracket means on upper and lower juxtaposed pallet units are spaced from one another when said pallet units are in said spaced-apart position, said juxtaposed bracket means contacting one another when said pallet units are in said moved-together position.

20. Apparatus for palletizing tube packages according to claim 10 wherein said bracket means supports said compression plate when said pallet units are in said spaced-apart position.

21. Apparatus for palletizing tube packages comprising:
a loader means having receiving means receiving said tube packages to be palletized;
a multi-deck pallet means comprising a plurality of superimposed pallet units disposed at a fixed distance from one another, each of said pallet units including a base support onto which said tube packages are loaded and a compression plate;
said loader means comprising a transport means movable between a start position and a load position, said transport means in moving from said start position to said load position being operable to transport tube packages from said receiving means to load said tube packages on one of said pallet units, said multi-deck pallet means further comprising compression plate holder means operable to separately dispose a compression plate in a compression position on the tube packages on each pallet unit after loading of said tube packages on said pallet unit by said transport means.

22. Apparatus for palletizing tube packages according to claim 21 wherein said holder means is operable to move said compression plate from an overlying position to a lowered position, said holder means holding said compression plate in said overlying position when said transport means moves from said start position to said load position to permit said transport means to load said tube packages onto the lower of two juxtaposed pallet units, said holding means being operable to lower said compression plate from said overlying position to said lowered position on the tube packages loaded on the lower of the two juxtaposed pallet units while said transport means is in said start position.

23. Apparatus for palletizing tube packages according to claim 21 wherein each of said pallet units comprises a receiving base on which said tube packages are loaded, said compression plate underlying said receiving base, each of said pallet units comprising pivotal arms means extending between said receiving base and said compression plate, said pivotal arm means being operable to effect relative movement between said receiving base and said compression plate.

24. Apparatus for palletizing tube packages according to claim 23 wherein said pivotal arm means comprises two sets of pivotal arms spaced from one another, and an interconnecting arm extending between said two sets of spaced pivotal arms.

25. Apparatus for palletizing tube packages according to claim 23 wherein said pivotal arm means comprises a pair of pivot arms pivotally connected to one another in the form of a scissor mechanism.

26. Apparatus for palletizing tube packages according to claim 23 wherein said pivotal arm means includes an engaging element, said loader means including actuating means operable to engage said engaging element to effect pivoting of said pivotal arm means to thereby move said compression plate relative to said receiving base.

27. Apparatus for palletizing tube packages according to claim 21 wherein said pallet means comprises a frame support means supporting each of said pallet units in a fixed position with each of said pallet units being substantially equally spaced from one another.

28. Apparatus for palletizing tube packages according to claim 21 wherein said pallet means comprises a support frame and compression plate actuating means moveable on said support frame, said compression plate actuating means being operable to engage and vertically move said compression plates.

29. Apparatus for palletizing tube packages according to claim 28 wherein said compression plate actuating means comprises elongated arm elements and finger elements pivotably mounted on said finger elements, said finger elements being pivotal to a position in which said finger elements are disposed in an engageable position to engage said compression plate so that said compression plate can be vertically moved by said compression plate actuating means.

30. Apparatus for palletizing tube packages comprising a plurality of pallet units, each of said pallet units being movable from an unloaded position to a loading position, each of said pallet units having support means with the support means of one pallet unit being supported on a juxtaposed pallet unit, the pallet unit in said loading position being designated a loading pallet unit, said loading pallet unit being supported on a juxtaposed underlying pallet unit by said support means when said loading pallet unit is being loaded in said loading position, the juxtaposed overlying pallet unit overlying said loading pallet unit being spaced from said loading pallet unit to thereby permit loading of said loading pallet unit with said tube packages, lifting means for lowering the juxtaposed overlying pallet unit from its unloaded position into its loading position after the first said loading pallet unit in said loading position has been loaded with said tube packages, each of said pallet units including a compression plate, said lifting means being operable to dispose a compression plate on the tube packages on the loading pallet unit which has just been loaded when lowering the juxtaposed overlying pallet unit into its loading position.

31. Apparatus for palletizing tube packages according to claim 30 wherein each of said pallet units has opposite sides, said support means extending vertically from said opposite sides to engage on underlying pallet unit when said pallet units are in said unloaded position.

32. Apparatus for palletizing tube packages according to claim 31 wherein each of said pallet units comprise beam members on said opposite sides, said support means comprising supporting feet disposed in pairs on said beam members.

33. Apparatus for palletizing tube packages according to claim 30 wherein said support means includes first positioning means on one pallet unit engaging second positioning means on an underlying juxtaposed pallet unit to facilitate positioning of said one pallet unit on said underlying juxtaposed pallet unit.

34. Apparatus for palletizing tube packages according to claim 30 wherein each of said pallet units has a rectangular parallelogram configuration with first spaced parallel sides and second spaced parallel sides with said first spaced parallel sides being longer than said second spaced parallel sides.

35. Apparatus for palletizing tube packages according to claim 34 wherein said pallet units are stackable on one another in superimposed array with juxtaposed pallet units being rotatably offset about a vertical axis such that said first spaced parallel sides of one pallet unit are angularly offset relative to said second spaced parallel sides of a juxtaposed overlying pallet unit.

36. Apparatus for palletizing tube packages according to claim 35 wherein said first spaced parallel sides of one pallet unit are disposed perpendicular to said second spaced parallel sides of a juxtaposed overlying pallet unit.

37. Apparatus for palletizing tube packages according to claim 30 wherein said pallet units have a square configuration.

38. Apparatus for palletizing tube packages according to claim 30 wherein each of said pallet units comprises a package receiving base on which said tube packages are disposed, said support means extending vertically from said receiving base, and compression plate engaging means extending from said support means and engaging said compression plate to support said compression plate in a position underlying the receiving base of the pallet unit when said pallet unit is in said unloading position, said compression plate being freely moveable from said compression plate engaging means when said pallet unit is moved from its unloaded to its loading position such that said compression plate is disposed on the loaded tube packages on an underlying pallet unit.

39. Apparatus for palletizing tube packages according to claim 38 wherein said support means comprise support legs extending vertically downwardly from said receiving base, said support legs having a lower portion, said compression plate engaging means comprising stops extending from said lower portion of said support legs, said compression plate being supported on said stops when said pallet unit is in said unloaded position.

40. Apparatus for palletizing tube packages according to claim 30 wherein said lifting means comprises actuating means moveable between an actuated position and an unactuated position, said actuating means when in said actuated position engaging a pallet unit such that said lifting means can lower the pallet unit from said unloaded position to said loading position, said actuating means when in said unactuated position being disengaged from said pallet unit such that said lifting means is moveable relative to said pallet unit.

\* \* \* \* \*